US010984375B2

(12) United States Patent
Lert, Jr. et al.

(10) Patent No.: US 10,984,375 B2
(45) Date of Patent: Apr. 20, 2021

(54) PICKING WORKSTATION WITH MOBILE ROBOTS AND MACHINE VISION VERIFICATION OF EACH TRANSFERS PERFORMED BY HUMAN OPERATORS

(71) Applicant: ALERT INNOVATION INC., North Billerica, MA (US)

(72) Inventors: John G. Lert, Jr., Wakefield, MA (US); William J. Fosnight, Windham, NH (US); Devin Lert, Wakefield, MA (US); Stephen Akiki, Lowell, MA (US)

(73) Assignee: Alert Innovation Inc., North Billerica, MA (US)

( * ) Notice: Subject to any disclaimer, the term of this patent is extended or adjusted under 35 U.S.C. 154(b) by 0 days.

(21) Appl. No.: 15/956,346

(22) Filed: Apr. 18, 2018

(65) Prior Publication Data

US 2018/0305123 A1    Oct. 25, 2018

Related U.S. Application Data

(60) Provisional application No. 62/486,756, filed on Apr. 18, 2017.

(51) Int. Cl.
| | |
|---|---|
| *B65G 1/137* | (2006.01) |
| *G06Q 10/08* | (2012.01) |
| *G06T 7/70* | (2017.01) |
| *G06K 9/00* | (2006.01) |
| *G05D 1/00* | (2006.01) |

(Continued)

(52) U.S. Cl.
CPC ......... *G06Q 10/087* (2013.01); *B65G 1/1378* (2013.01); *G05D 1/0088* (2013.01); *G06K 9/00335* (2013.01); *G06T 7/70* (2017.01); *B65G 1/0492* (2013.01); *B65G 2201/0258* (2013.01); *B65G 2203/041* (2013.01); *B65G 2203/044* (2013.01); *G05D 1/0287* (2013.01); *G05D 2201/0216* (2013.01)

(58) Field of Classification Search
CPC ................... B65G 2203/044; B65G 2203/041
See application file for complete search history.

(56) References Cited

U.S. PATENT DOCUMENTS

| | | |
|---|---|---|
| 5,179,329 A | 1/1993 | Nishikawa et al. |
| 5,472,309 A | 12/1995 | Bernard et al. |

(Continued)

FOREIGN PATENT DOCUMENTS

| | | |
|---|---|---|
| DE | 202011107932 | 1/2012 |
| EP | 2650237 B1 | 11/2014 |

(Continued)

OTHER PUBLICATIONS

Response to Office Action filed Jun. 5, 2020 in European Patent Application No. 18726256.3.

(Continued)

*Primary Examiner* — Thomas Randazzo
(74) *Attorney, Agent, or Firm* — Vierra Magen Marcus LLP

(57) ABSTRACT

A workstation is disclosed for transferring objects between containers such as product and order totes in an order fulfillment system. The workstation may include an object pick system, for example including a measuring array or a machine vision system, which directs and monitors the transfer of objects between the containers.

28 Claims, 27 Drawing Sheets

Machine Vision and Measuring Arrays

Machine Vision - Side

Figure 1:
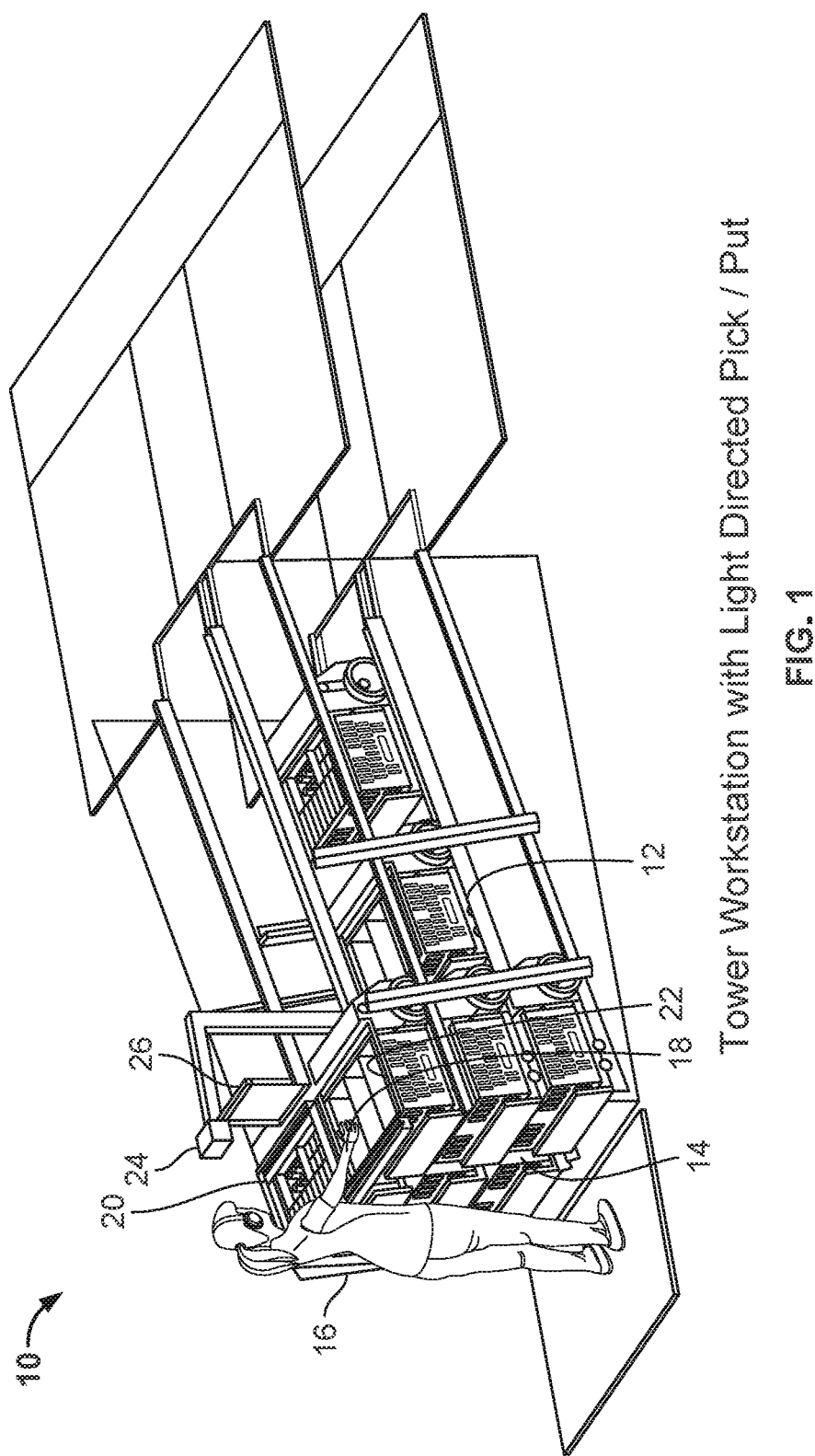

(51) Int. Cl.
  *B65G 1/04* (2006.01)
  *G05D 1/02* (2020.01)

(56) References Cited

U.S. PATENT DOCUMENTS

| | | | |
|---|---|---|---|
| 5,642,976 | A | 7/1997 | Konstant |
| 6,289,260 | B1 | 9/2001 | Bradley et al. |
| 7,591,630 | B2 | 9/2009 | Lert, Jr. |
| 7,861,844 | B2 | 1/2011 | Hayduchok et al. |
| 7,894,932 | B2 | 2/2011 | Mountz et al. |
| 7,894,933 | B2 | 2/2011 | Mountz et al. |
| 7,991,505 | B2 | 8/2011 | Lert, Jr. et al. |
| 8,032,249 | B1 * | 10/2011 | Shakes .............. B07C 5/38 700/216 |
| 8,104,601 | B2 | 1/2012 | Hayduchok et al. |
| 8,276,740 | B2 | 10/2012 | Hayduchok et al. |
| 8,311,902 | B2 | 11/2012 | Mountz et al. |
| 8,425,173 | B2 | 4/2013 | Lert et al. |
| 8,447,665 | B1 | 5/2013 | Schoenharl et al. |
| 8,483,869 | B2 | 7/2013 | Wurman et al. |
| 8,527,325 | B1 | 9/2013 | Atreya et al. |
| 8,594,835 | B2 | 11/2013 | Lert et al. |
| 8,622,194 | B2 | 1/2014 | DeWitt et al. |
| 8,626,335 | B2 | 1/2014 | Wurman et al. |
| 8,694,152 | B2 | 4/2014 | Cyrulik et al. |
| 8,718,814 | B1 | 5/2014 | Clark et al. |
| 8,740,538 | B2 | 6/2014 | Lert et al. |
| 8,831,984 | B2 | 9/2014 | Hoffman et al. |
| 8,892,240 | B1 | 11/2014 | Vliet et al. |
| 8,965,562 | B1 | 2/2015 | Wurman et al. |
| 8,972,045 | B1 | 3/2015 | Mountz et al. |
| 8,983,647 | B1 | 3/2015 | Dwarakanath et al. |
| 9,008,828 | B2 | 4/2015 | Worsley |
| 9,008,829 | B2 | 4/2015 | Worsley |
| 9,008,830 | B2 | 4/2015 | Worsley |
| 9,020,632 | B2 | 4/2015 | Naylor |
| 9,037,286 | B2 | 5/2015 | Lert |
| 9,051,120 | B2 | 6/2015 | Lert et al. |
| 9,096,375 | B2 | 8/2015 | Lert et al. |
| 9,111,251 | B1 | 8/2015 | Brazeau |
| 9,129,250 | B1 | 9/2015 | Sestini et al. |
| 9,139,363 | B2 | 9/2015 | Lert |
| 9,242,798 | B2 | 1/2016 | Guan |
| 9,260,245 | B2 | 2/2016 | Este et al. |
| 9,321,591 | B2 | 4/2016 | Lert et al. |
| 9,330,373 | B2 | 5/2016 | Mountz et al. |
| 9,334,113 | B2 | 5/2016 | Naylor |
| 9,334,116 | B2 | 5/2016 | DeWitt et al. |
| 9,378,482 | B1 | 6/2016 | Pikler et al. |
| 9,423,796 | B2 | 8/2016 | Sullivan et al. |
| 9,428,295 | B2 | 8/2016 | Vliet et al. |
| 2005/0047895 | A1 | 3/2005 | Lert |
| 2006/0206235 | A1 * | 9/2006 | Shakes ............ B65G 1/1373 700/216 |
| 2006/0257236 | A1 | 11/2006 | Stingel, III et al. |
| 2006/0272736 | A1 * | 12/2006 | Mizuno .............. B67D 1/08 141/94 |
| 2007/0127691 | A1 | 6/2007 | Lert, Jr. |
| 2009/0138122 | A1 * | 5/2009 | Wagner ............ A61G 12/001 700/226 |
| 2010/0076591 | A1 | 3/2010 | Lert, Jr. |
| 2010/0316468 | A1 | 12/2010 | Lert et al. |
| 2010/0316469 | A1 | 12/2010 | Lert et al. |
| 2010/0316470 | A1 | 12/2010 | Lert et al. |
| 2010/0322746 | A1 | 12/2010 | Lert |
| 2010/0322747 | A1 | 12/2010 | Lert et al. |
| 2012/0101627 | A1 * | 4/2012 | Lert ................. B65G 1/1373 700/216 |
| 2012/0186942 | A1 | 7/2012 | Toebes et al. |
| 2012/0195720 | A1 | 8/2012 | Sullivan et al. |
| 2013/0246229 | A1 | 9/2013 | Mountz et al. |
| 2014/0088758 | A1 | 3/2014 | Lert et al. |
| 2014/0157732 | A1 * | 6/2014 | Gasber ............... B65B 5/12 53/473 |
| 2014/0212249 | A1 | 7/2014 | Kawano |
| 2014/0257553 | A1 | 9/2014 | Shakes et al. |
| 2014/0271063 | A1 | 9/2014 | Lert et al. |
| 2014/0288696 | A1 | 9/2014 | Lert |
| 2014/0308098 | A1 | 10/2014 | Lert et al. |
| 2014/0379588 | A1 * | 12/2014 | Gates .............. G06Q 10/30 705/308 |
| 2015/0095189 | A1 * | 4/2015 | Dharssi ............. G07G 1/0081 705/26.8 |
| 2015/0203295 | A1 * | 7/2015 | Nakamura ........... B66F 9/07 414/274 |
| 2015/0266672 | A1 | 9/2015 | Lert et al. |
| 2015/0286967 | A1 | 10/2015 | Lert et al. |
| 2015/0353282 | A1 * | 12/2015 | Mansfield ............ G05D 1/00 700/214 |
| 2015/0375938 | A9 | 12/2015 | Lert et al. |
| 2016/0016733 | A1 | 1/2016 | Lert |
| 2016/0075512 | A1 | 3/2016 | Lert |
| 2016/0355337 | A1 * | 12/2016 | Lert ................... B65G 1/0492 |
| 2017/0043953 | A1 * | 2/2017 | Battles ............. G06Q 10/087 |
| 2017/0158430 | A1 | 6/2017 | Raizer |
| 2017/0267452 | A1 | 9/2017 | Goren et al. |
| 2017/0290345 | A1 * | 10/2017 | Garden ............. B25J 9/0093 |
| 2017/0297820 | A1 | 10/2017 | Grinnell et al. |
| 2017/0330142 | A1 | 11/2017 | Kanellos et al. |
| 2017/0341873 | A1 * | 11/2017 | Vivet ................ B65G 43/08 |
| 2018/0082279 | A1 * | 3/2018 | Vasgaard ............. B62B 3/001 |
| 2018/0089474 | A1 * | 3/2018 | Ramon ............... G06Q 50/28 |
| 2019/0156086 | A1 * | 5/2019 | Plummer ............ G06T 5/006 |
| 2019/0185267 | A1 * | 6/2019 | Mattern .............. B07C 5/34 |
| 2019/0325714 | A1 * | 10/2019 | Rosenberg ......... G09F 9/375 |
| 2019/0361672 | A1 * | 11/2019 | Odhner ............. B25J 9/1697 |

FOREIGN PATENT DOCUMENTS

| | | |
|---|---|---|
| EP | 2651786 B1 | 5/2016 |
| EP | 2651787 B1 | 5/2016 |
| JP | 2005029391 | 2/2005 |
| WO | 2005068327 A1 | 7/2005 |
| WO | 2005097550 | 10/2005 |
| WO | 2016172793 A1 | 11/2016 |
| WO | 2016199033 A1 | 12/2016 |
| WO | 2017064401 A1 | 4/2017 |

OTHER PUBLICATIONS

English language Abstract for WO2017064401 published Apr. 20, 2017.
International Search Report and Written Opinion dated Oct. 10, 2018 in International Patent Application No. PCT/US2018/028170.
English language Abstract for WO2005068327 published Jul. 28, 2005.
Office Action dated Dec. 3, 2020, and English language translation thereof, in Japanese Patent Application No. 2020-506136.
English language Abstract and Machine Translation of JP2005029391 published Feb. 3, 2005.
Examiner's Report dated Dec. 10, 2020 in Canadian Patent Application No. 3058936.
Invitation to Pay Additional Fees and Partial International Search dated Jul. 17, 2018 in International Patent Application No. PCT/US2018/028170.

\* cited by examiner

Tower Workstation with Light Directed Pick / Put

Figure 2:
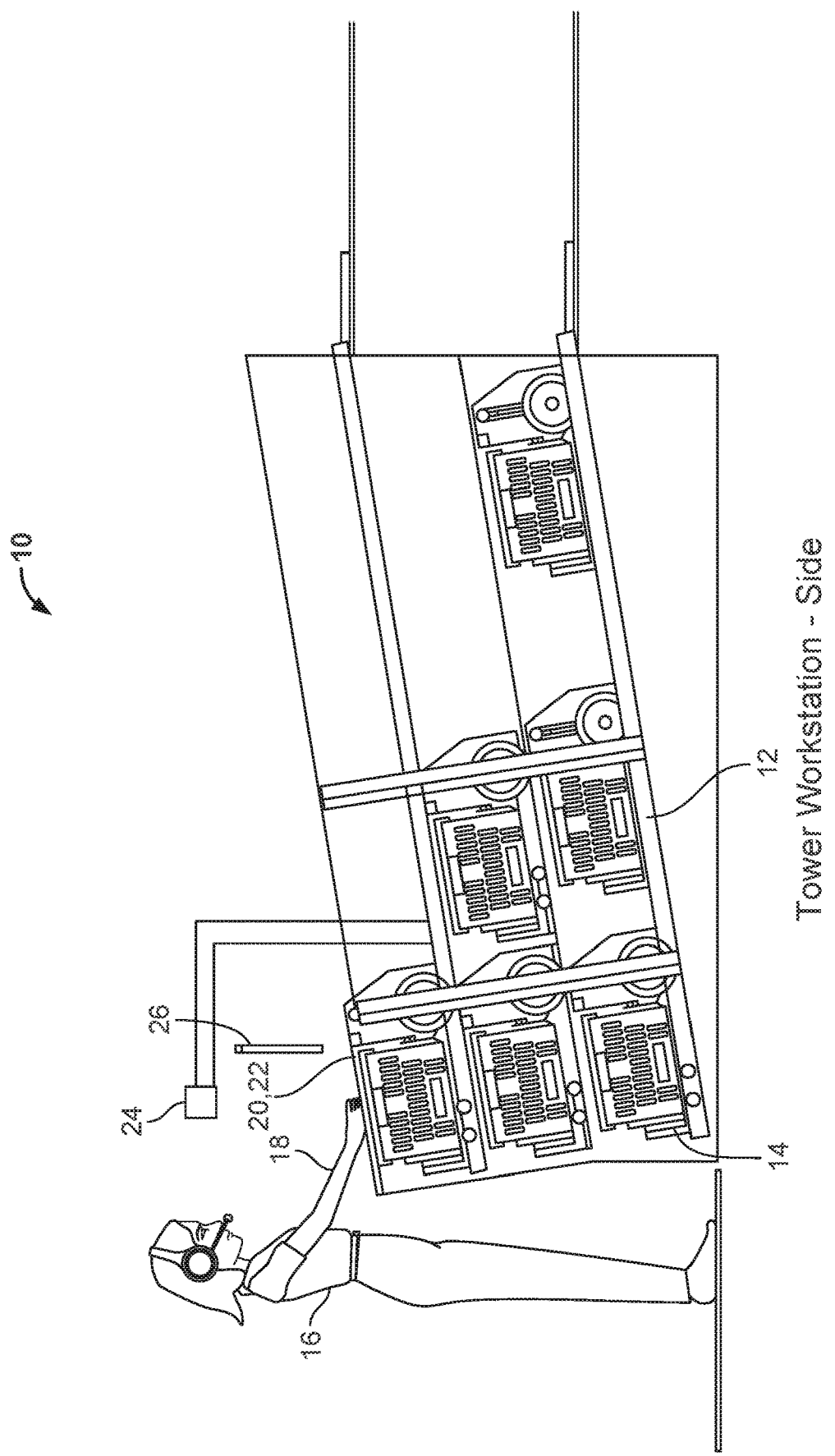

FIG. 2　Tower Workstation - Side

Tower Workstation - Front

Figure 7:
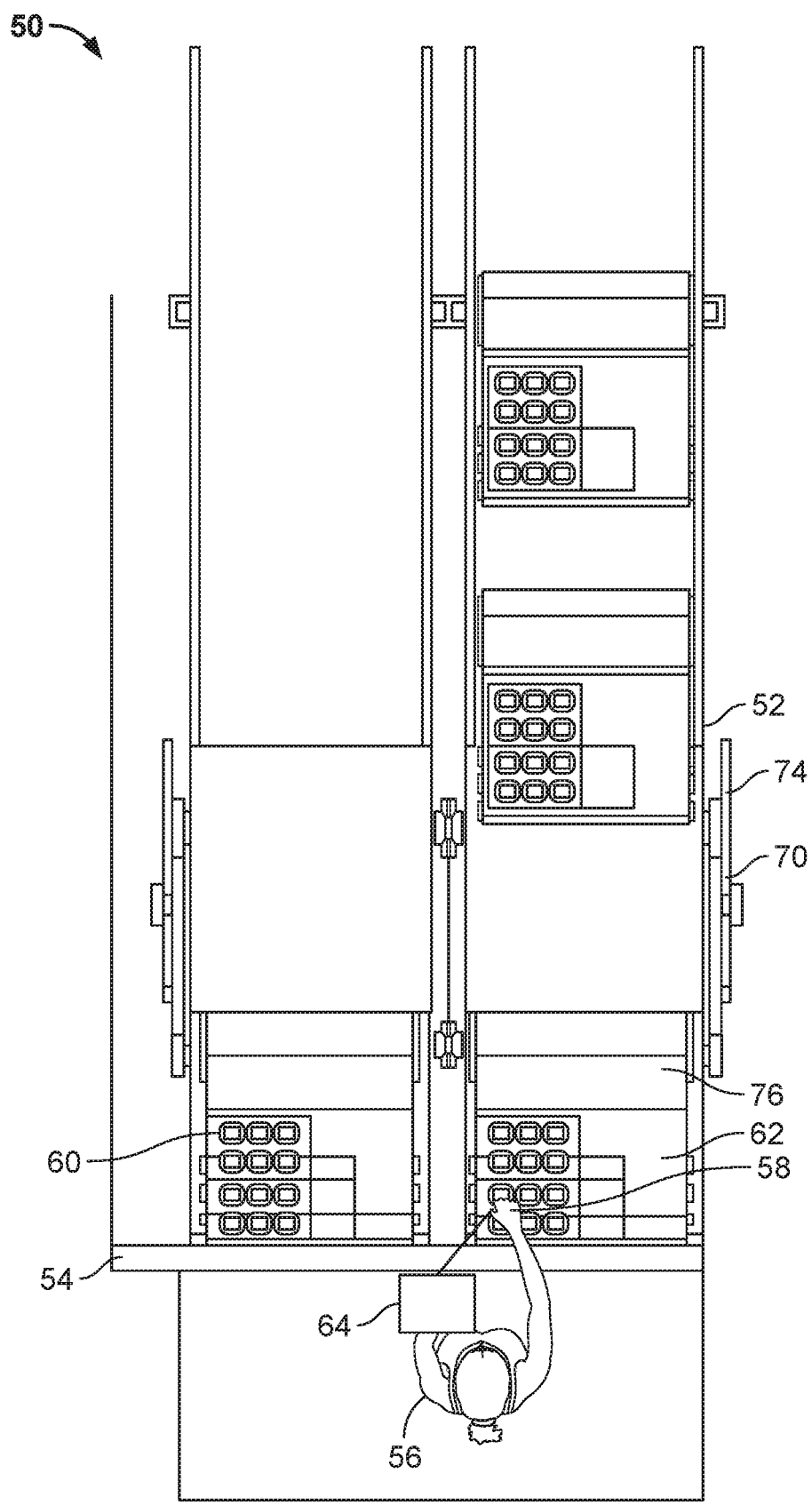

Ferris Workstation (Link) - Top FIG. 7

Ferris Workstation (Link) - Exploded View

Ferris Workstation (Chain) with Light Directed Pick / Put

Ferris Workstation (Chain) - Top

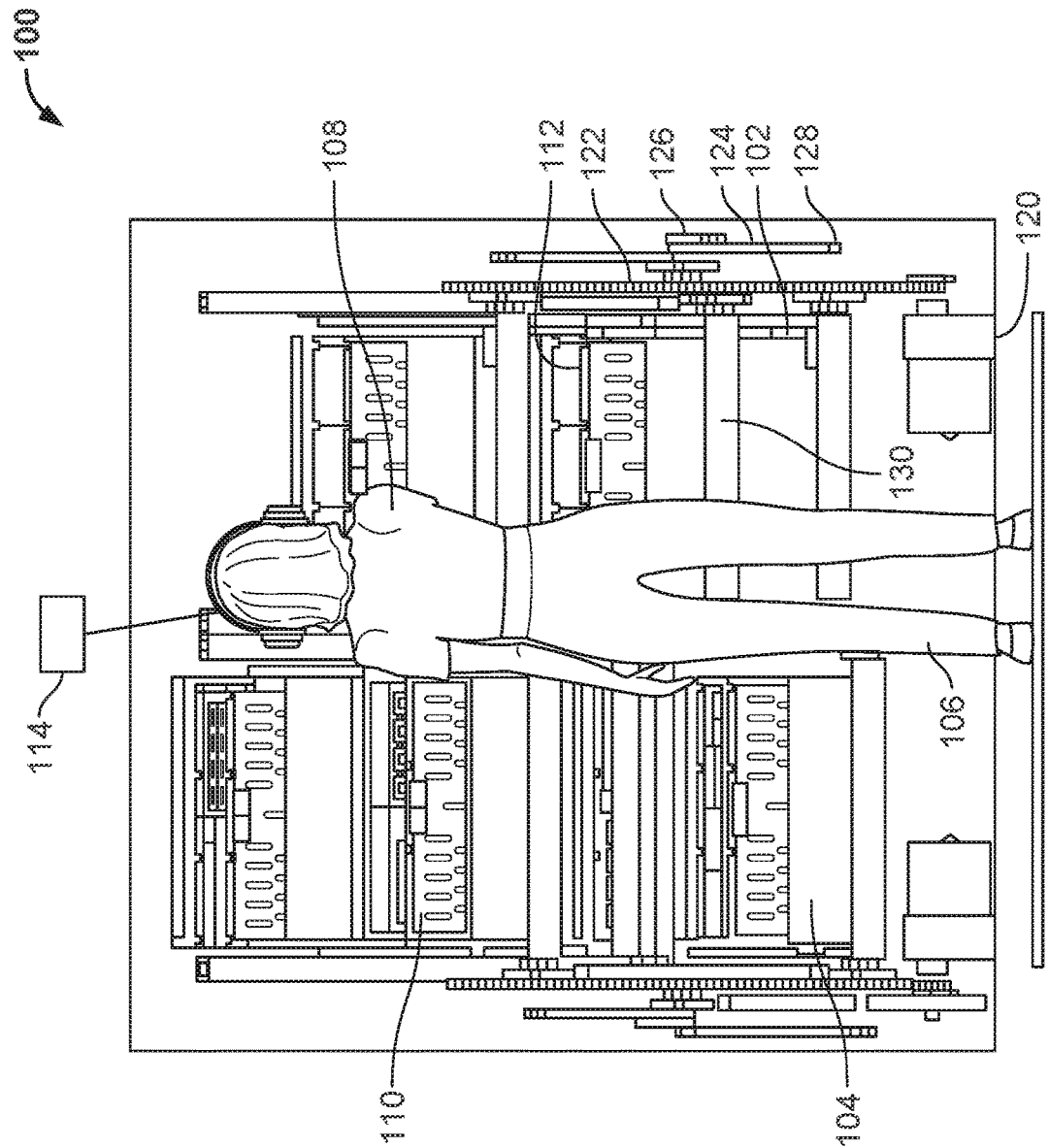

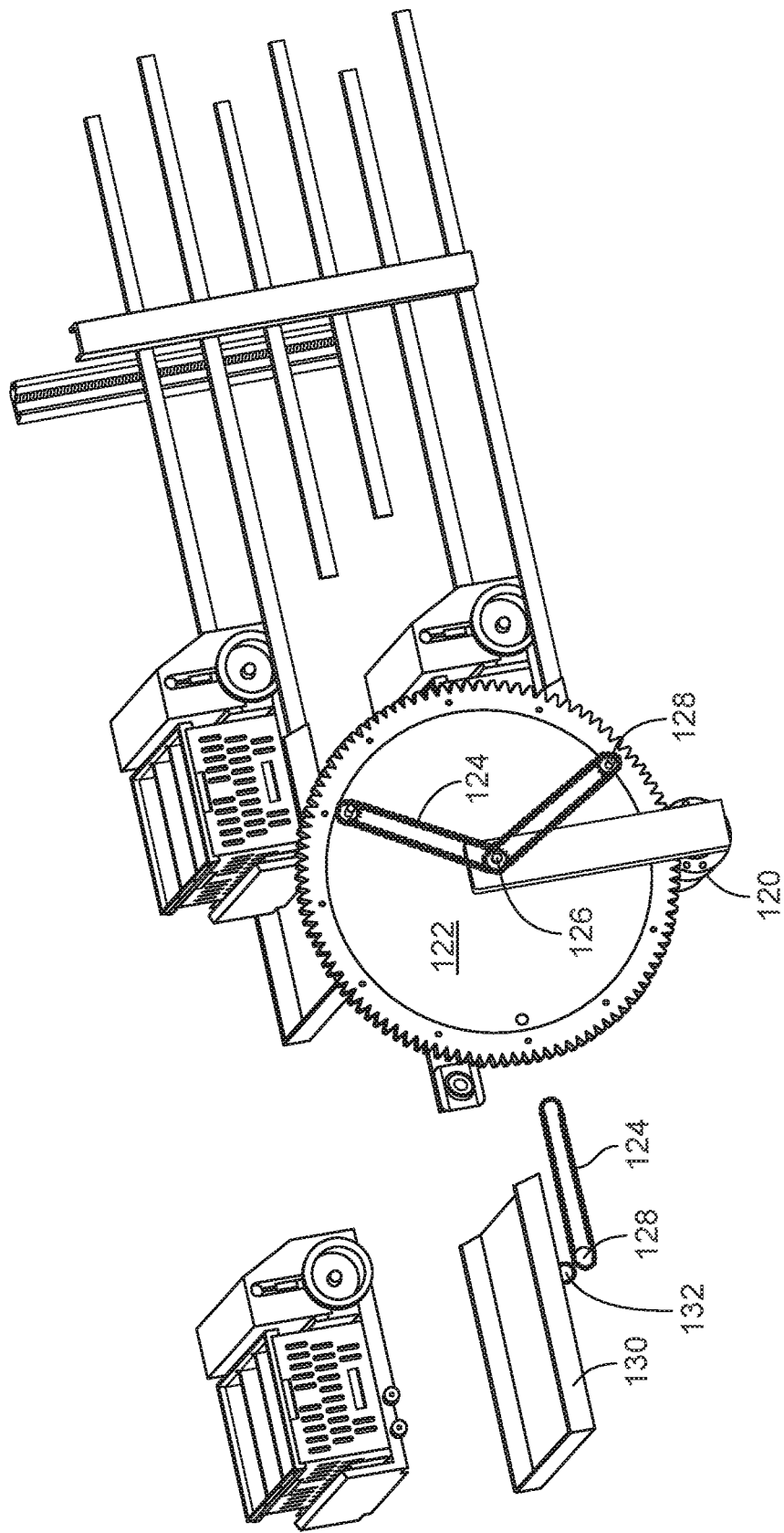
FIG. 12A Ferris Workstation (Chain) - Exploded View

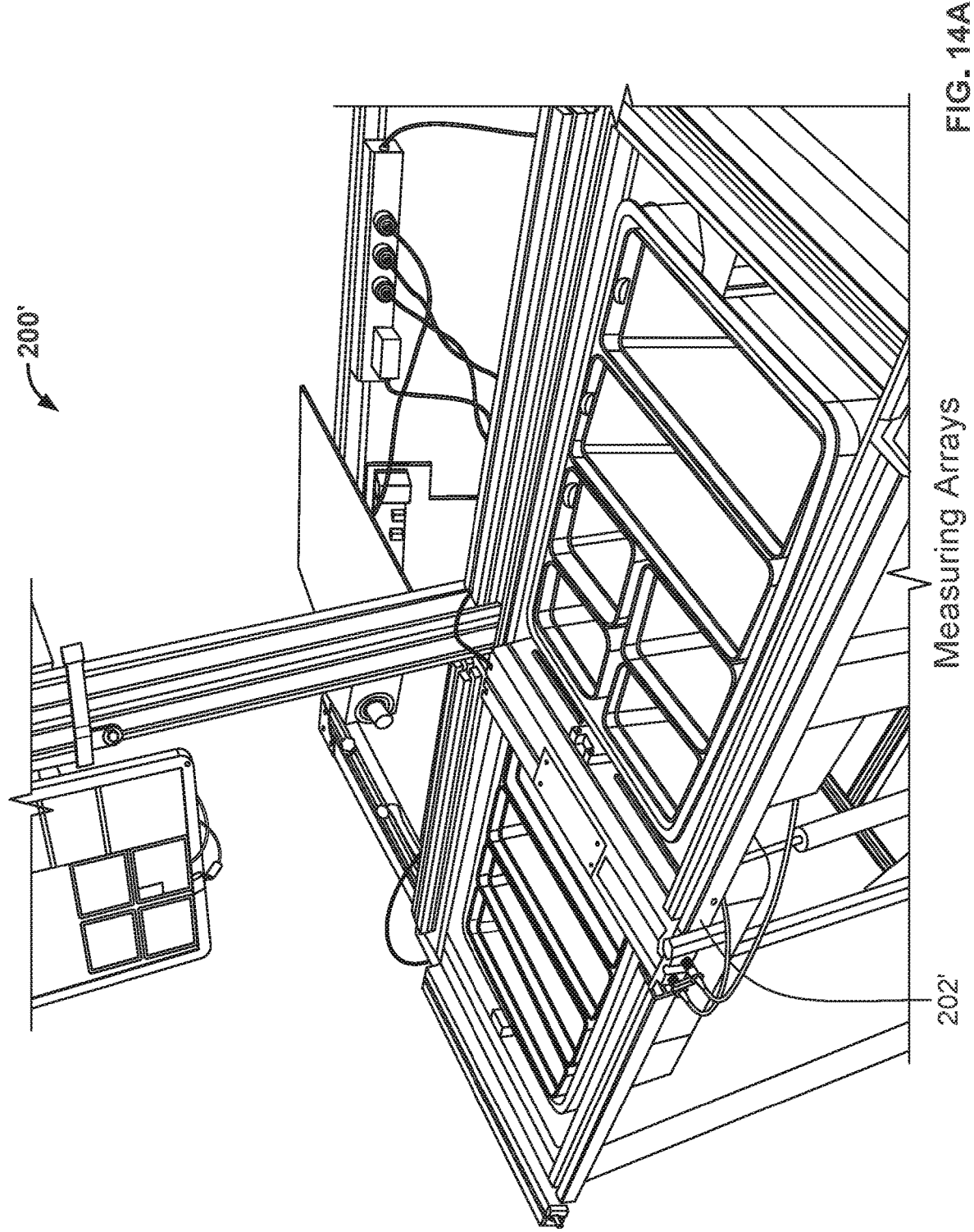

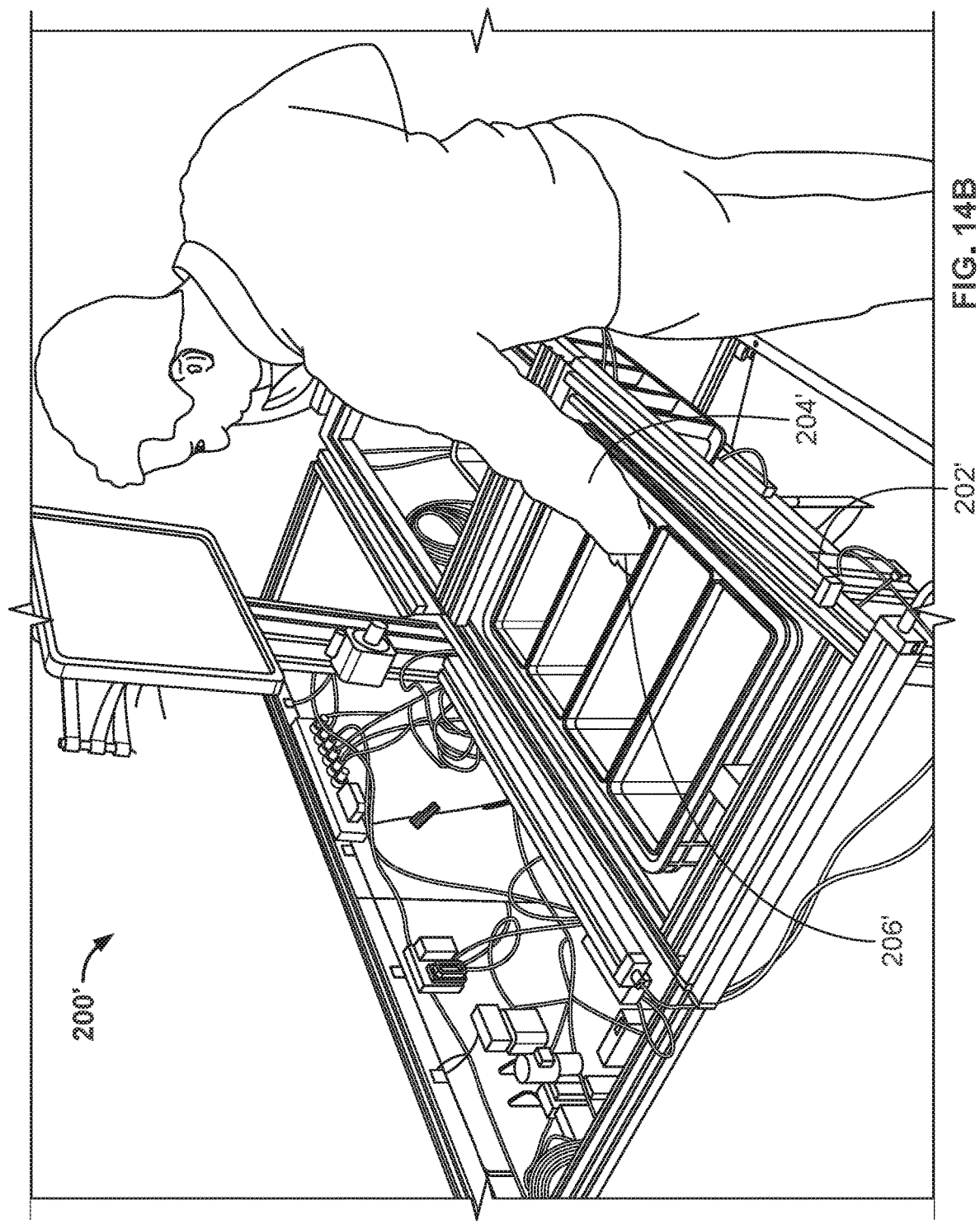

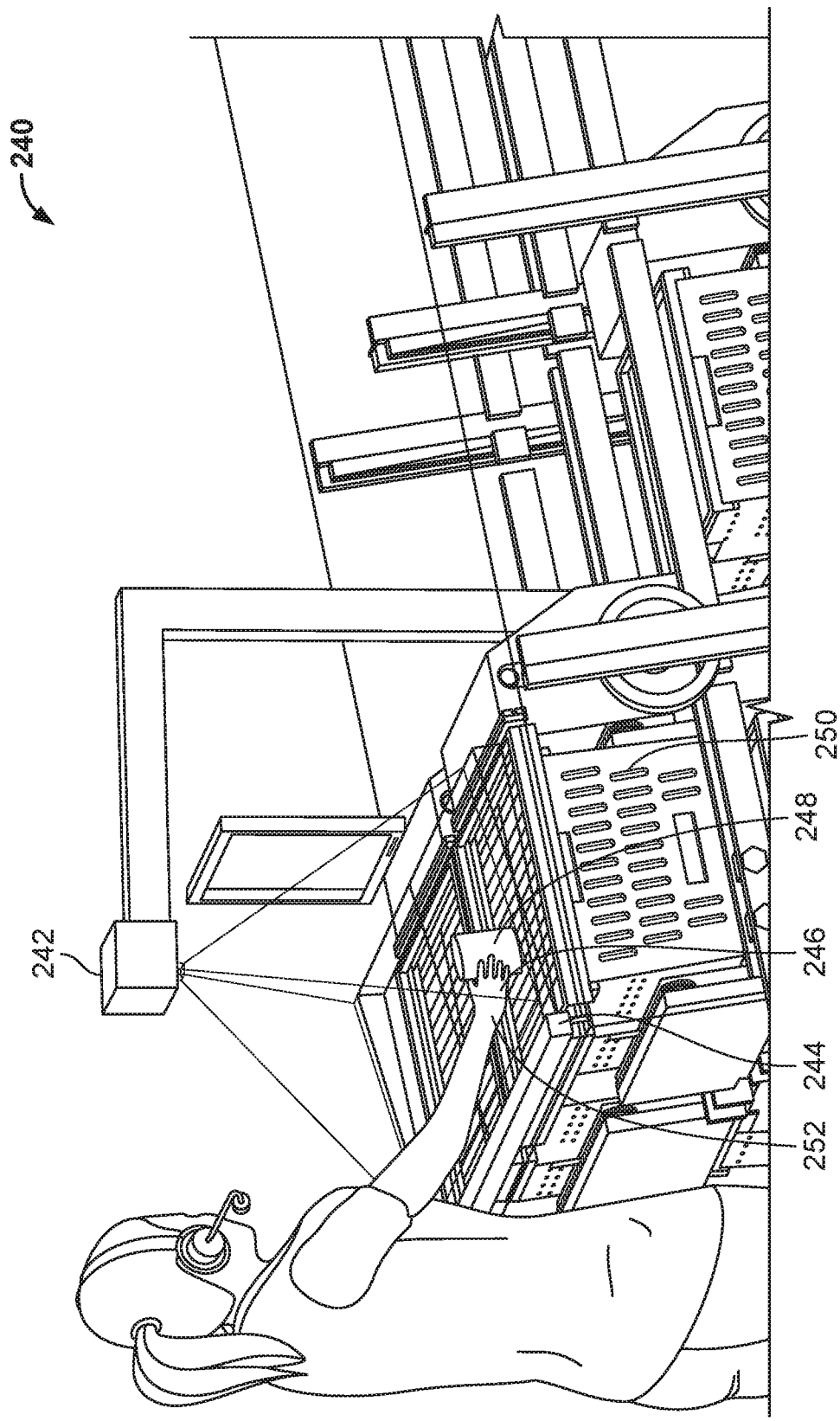
FIG. 15 Machine Vision and Measuring Arrays

Tote Image - Overhead Camera

Recognized Sub-Tote Configuration - Machine Vision

Sub-Tote Configuration Overlay – Machine Vision

Workstation-Automated

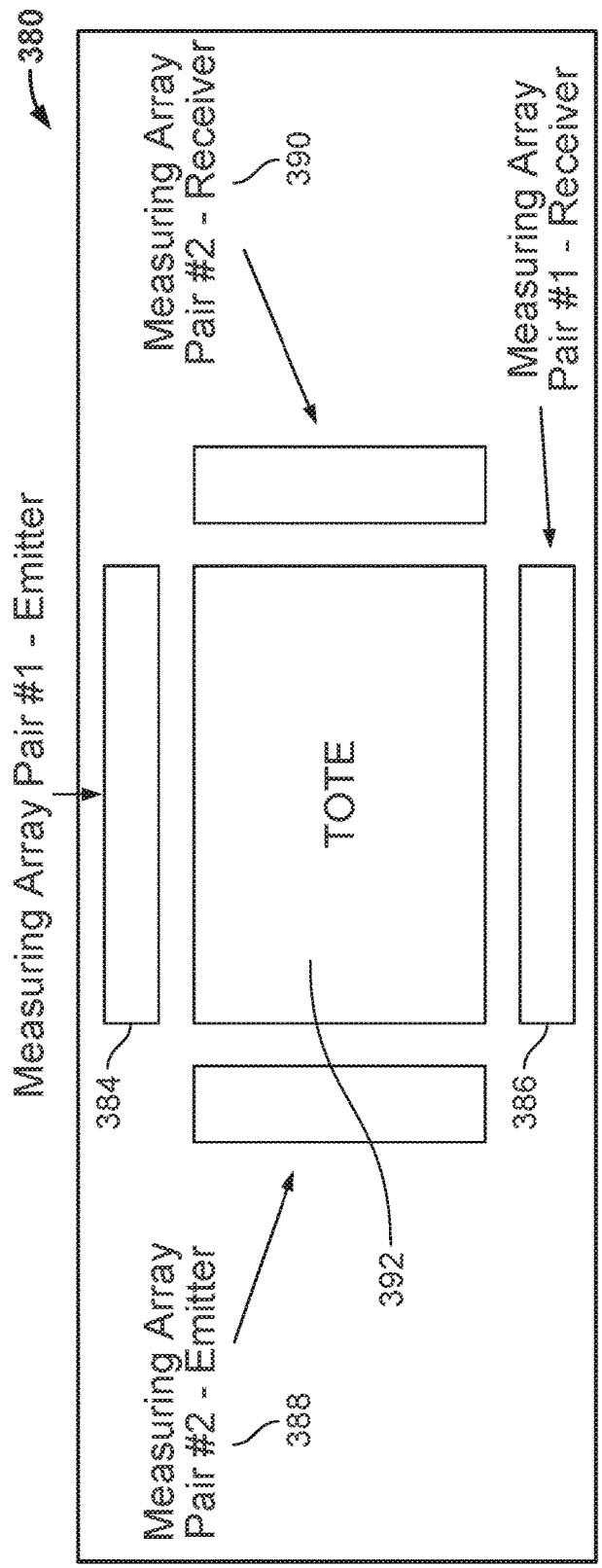
FIG. 22 - Tote and Measuring Array Configuration
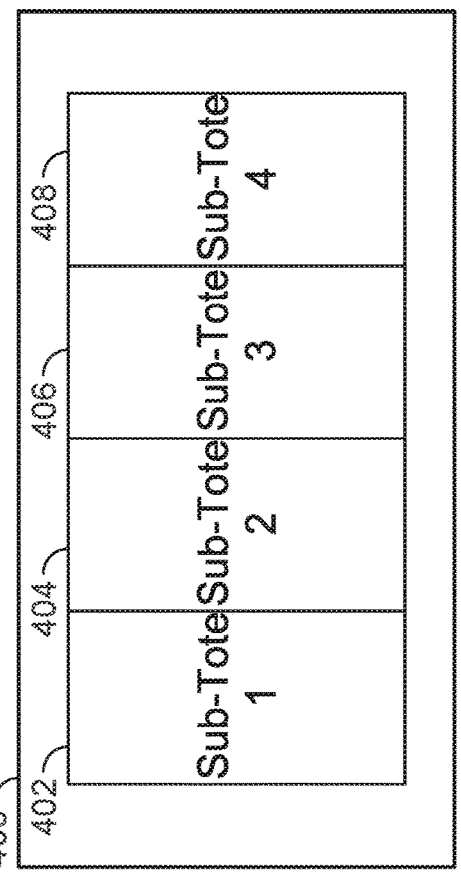
FIG. 23 - Example Tote Layout

PICKING WORKSTATION WITH MOBILE ROBOTS AND MACHINE VISION VERIFICATION OF EACH TRANSFERS PERFORMED BY HUMAN OPERATORS

PRIORITY CLAIM

The present application claims priority to U.S. Provisional Patent Application No. 62/486,756, filed on Apr. 18, 2017, entitled "Picking Workstation with Mobile Robots & Machine Vision Verification of Each Transfers Performed by Human Operators," which application is incorporated by reference herein in its entirety.

BACKGROUND

Automated each-picking systems typically require the use of human operators (aka Pickers) at designated workstations to transfer "eaches" from product totes to customer order totes. Current methodologies for verifying the accuracy and completion of a transfer of an each include (sometimes in combination) scanning barcode labels on products, pressing mechanical tote-release buttons, and interacting with a graphical user interface. These methods of validation create inefficiencies within the picking process and require a greater level of effort by the picker.

DETAILED DESCRIPTION OF THE DRAWINGS

Figure 3:
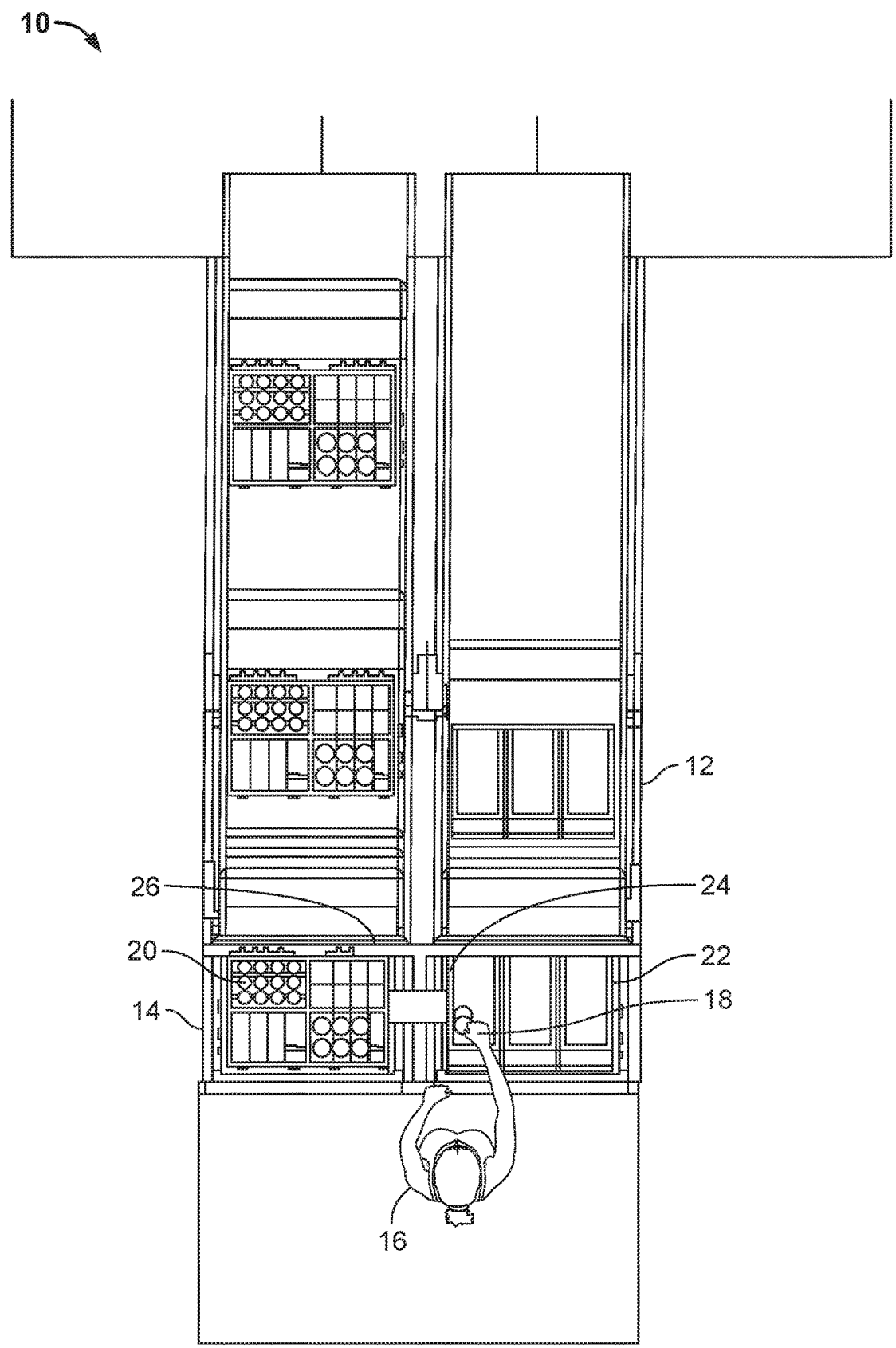
Figure 4:
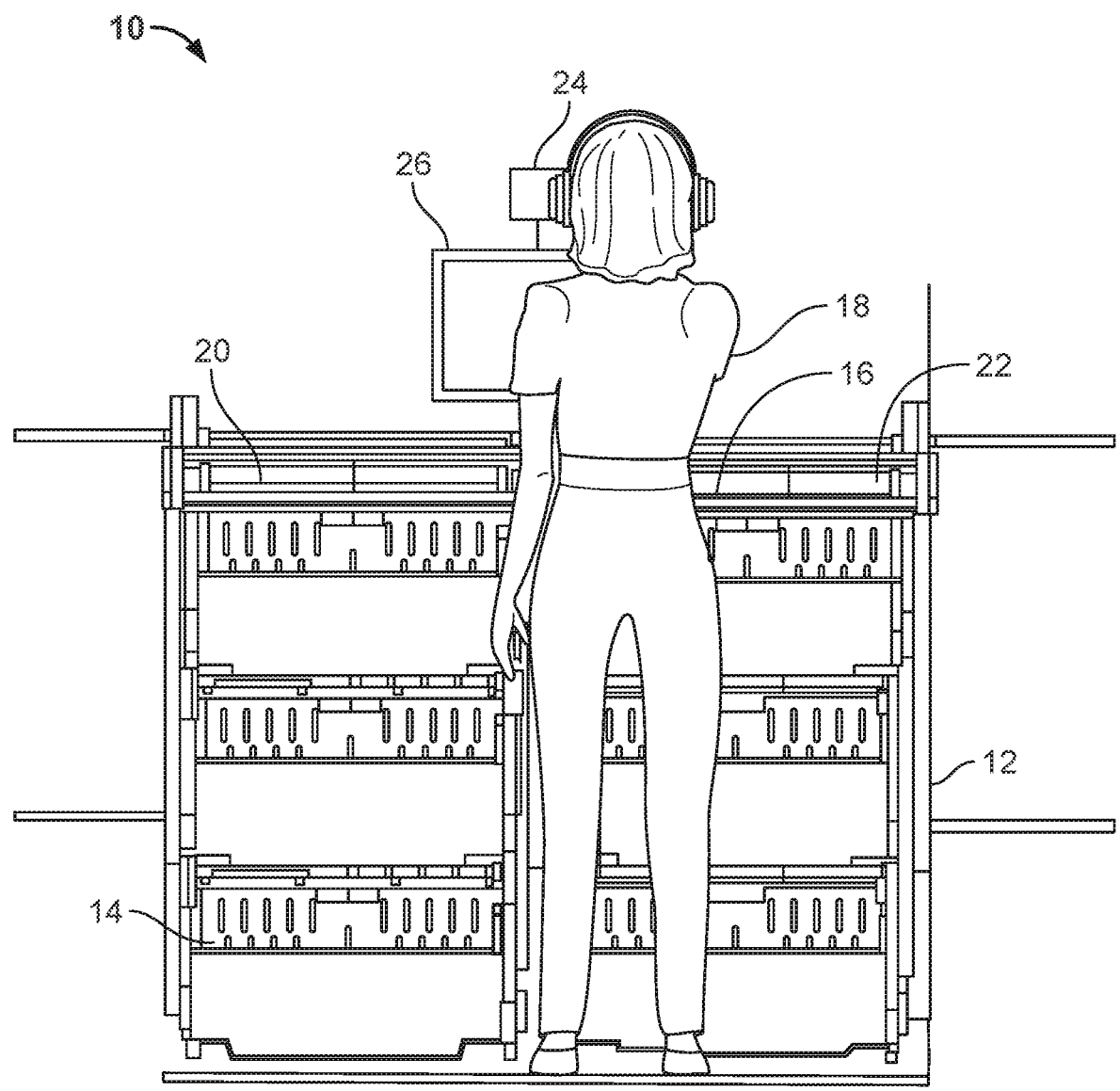
Figure 5:
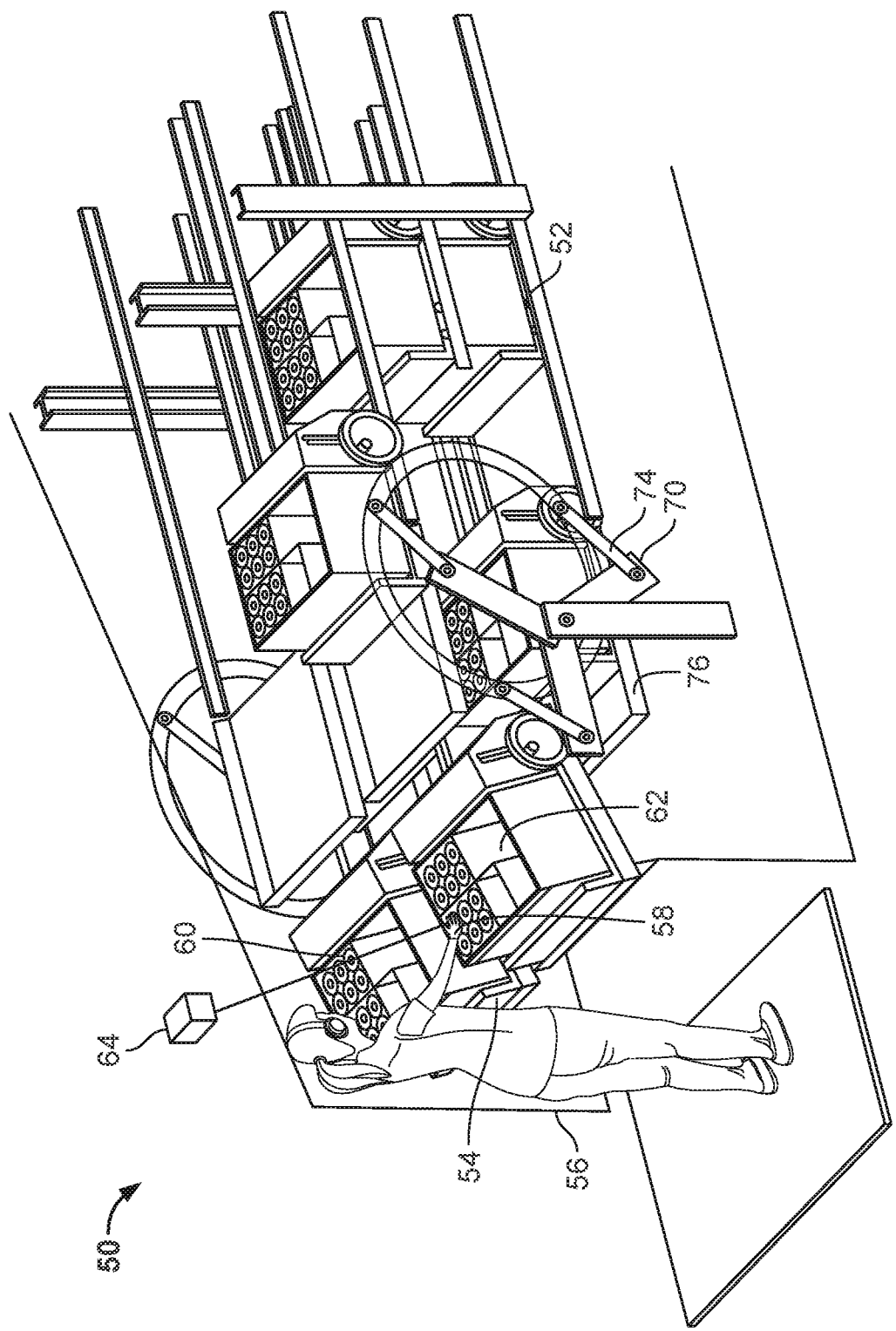
Figure 6:
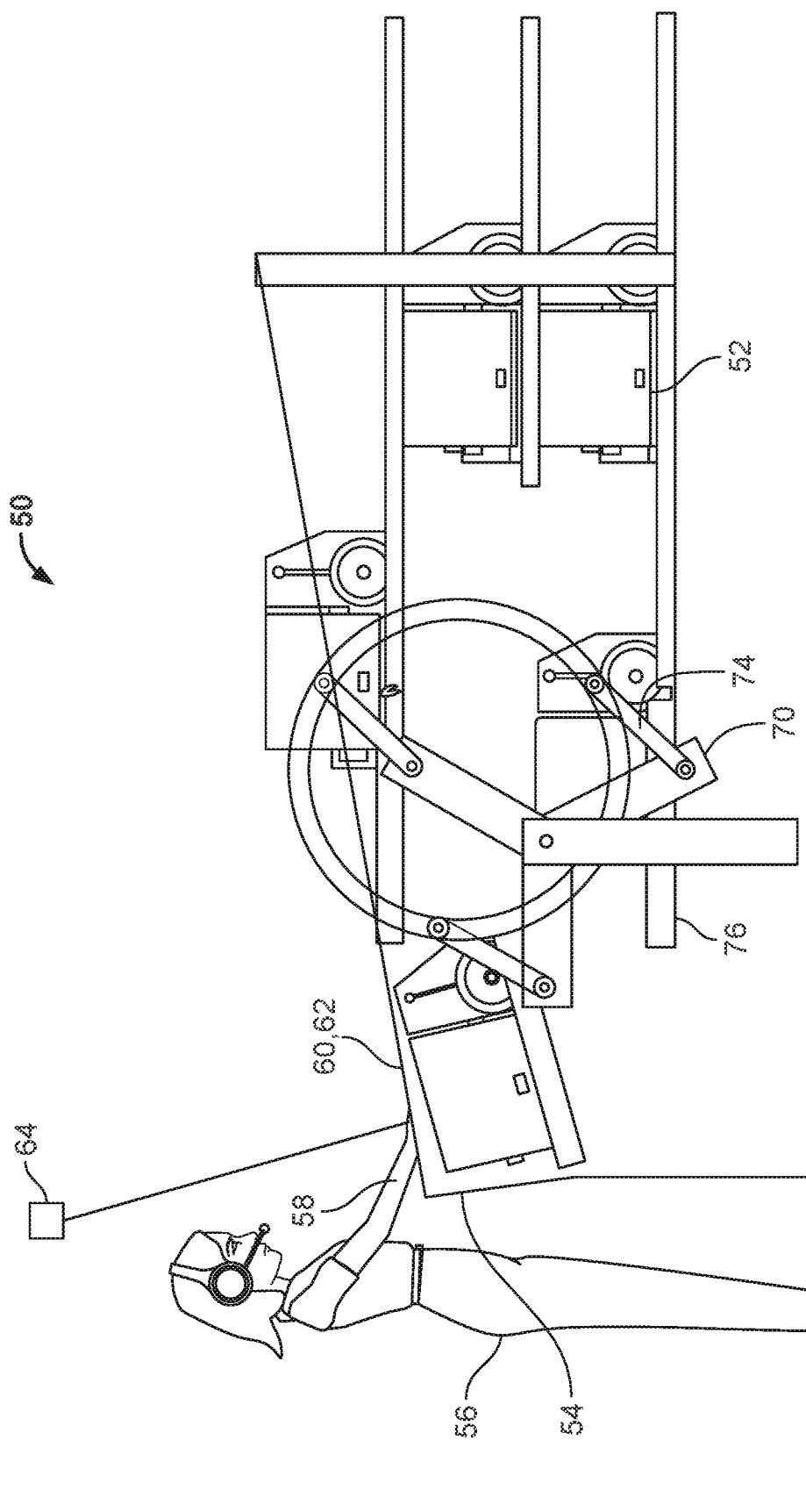
Figure 8:
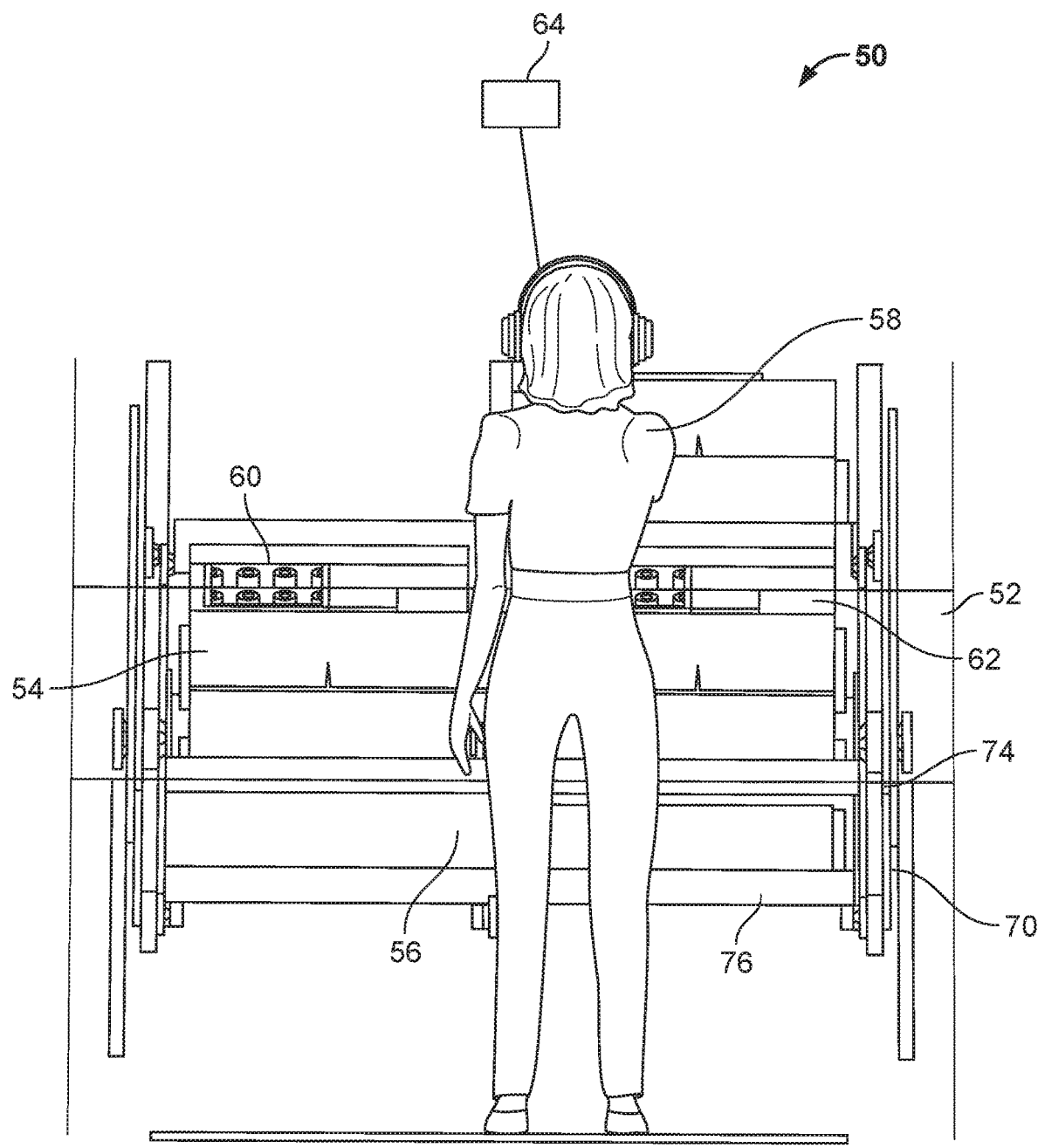
Figure 8A:
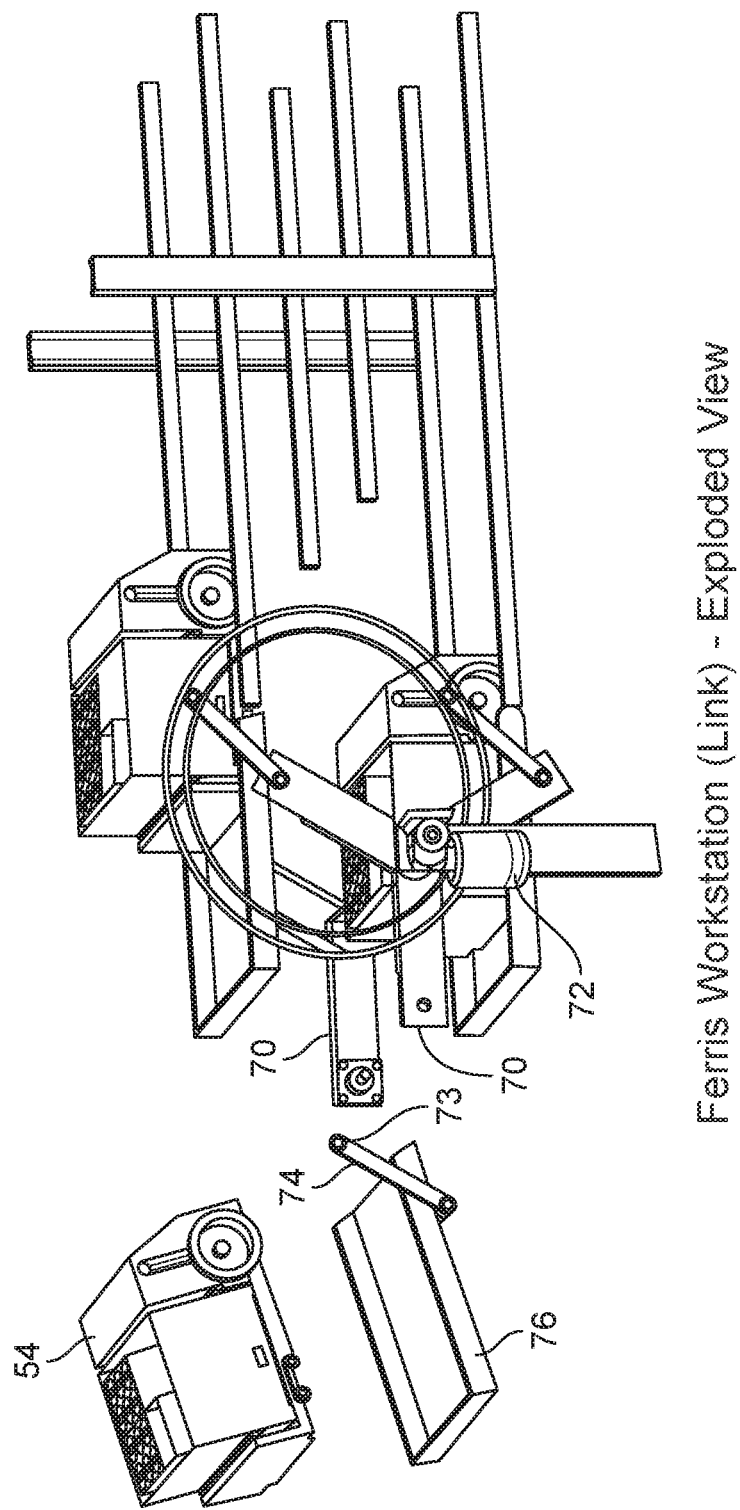
Figure 9:
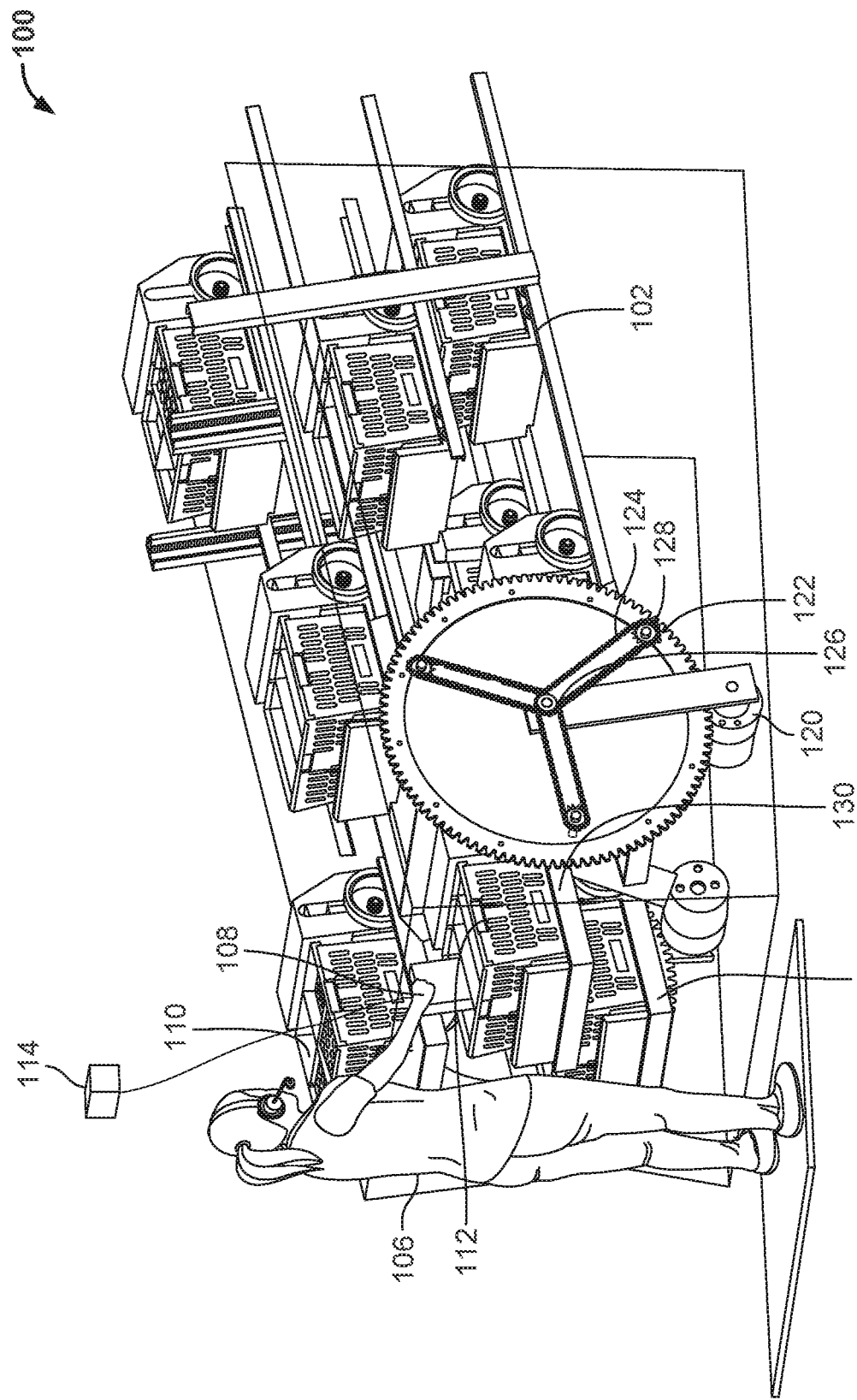
Figure 10:
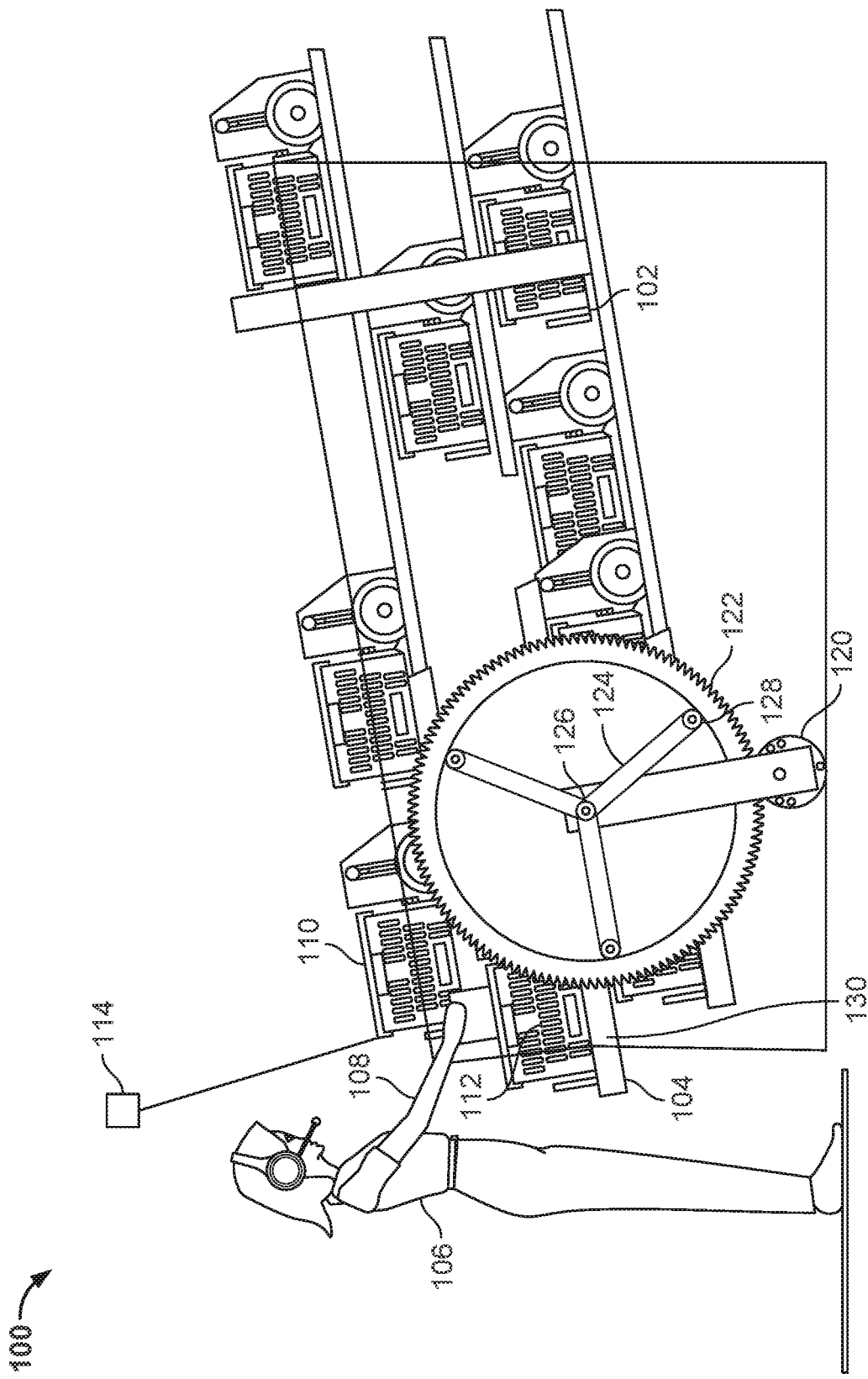
Figure 11:
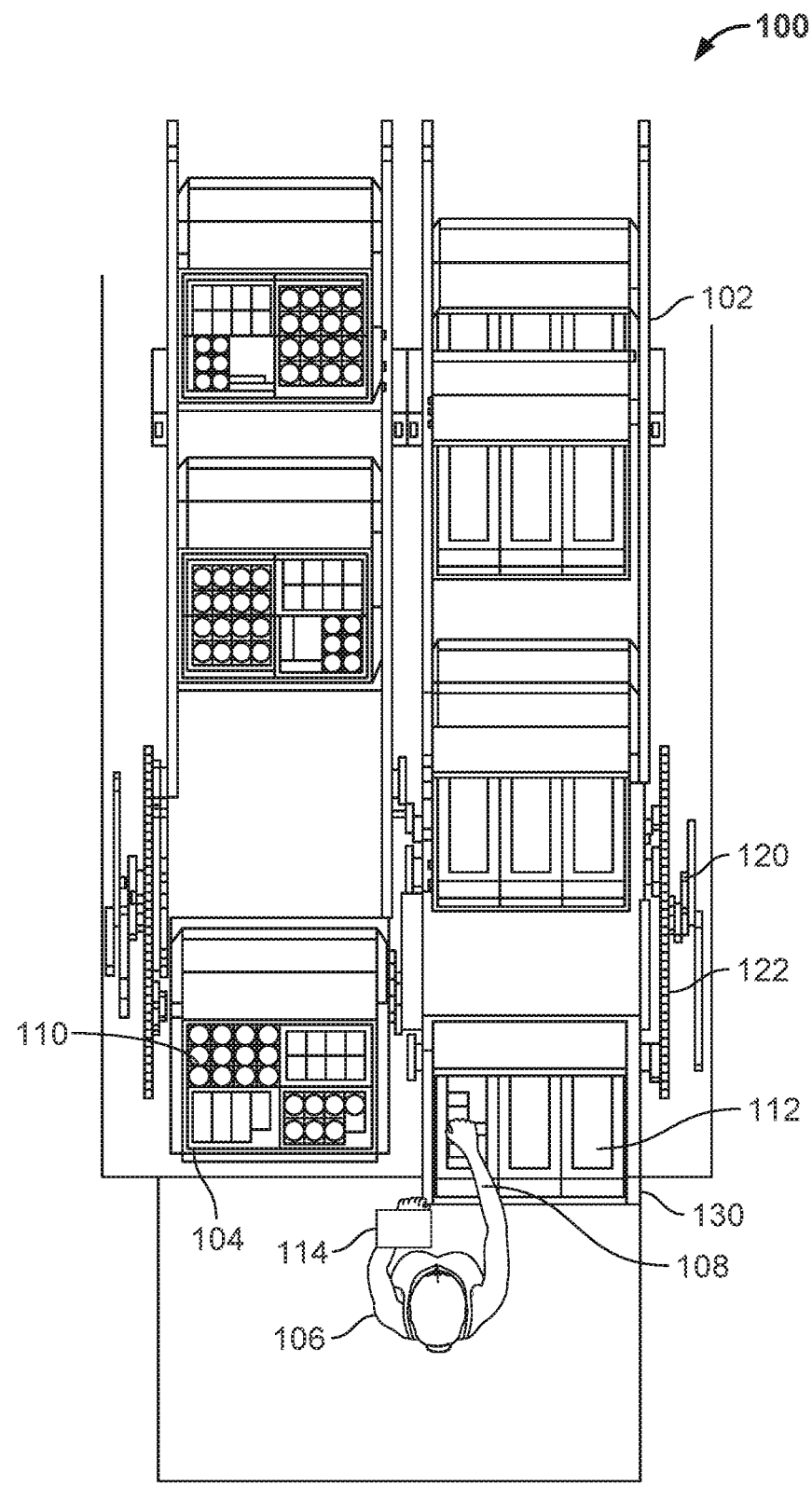
Figure 13:
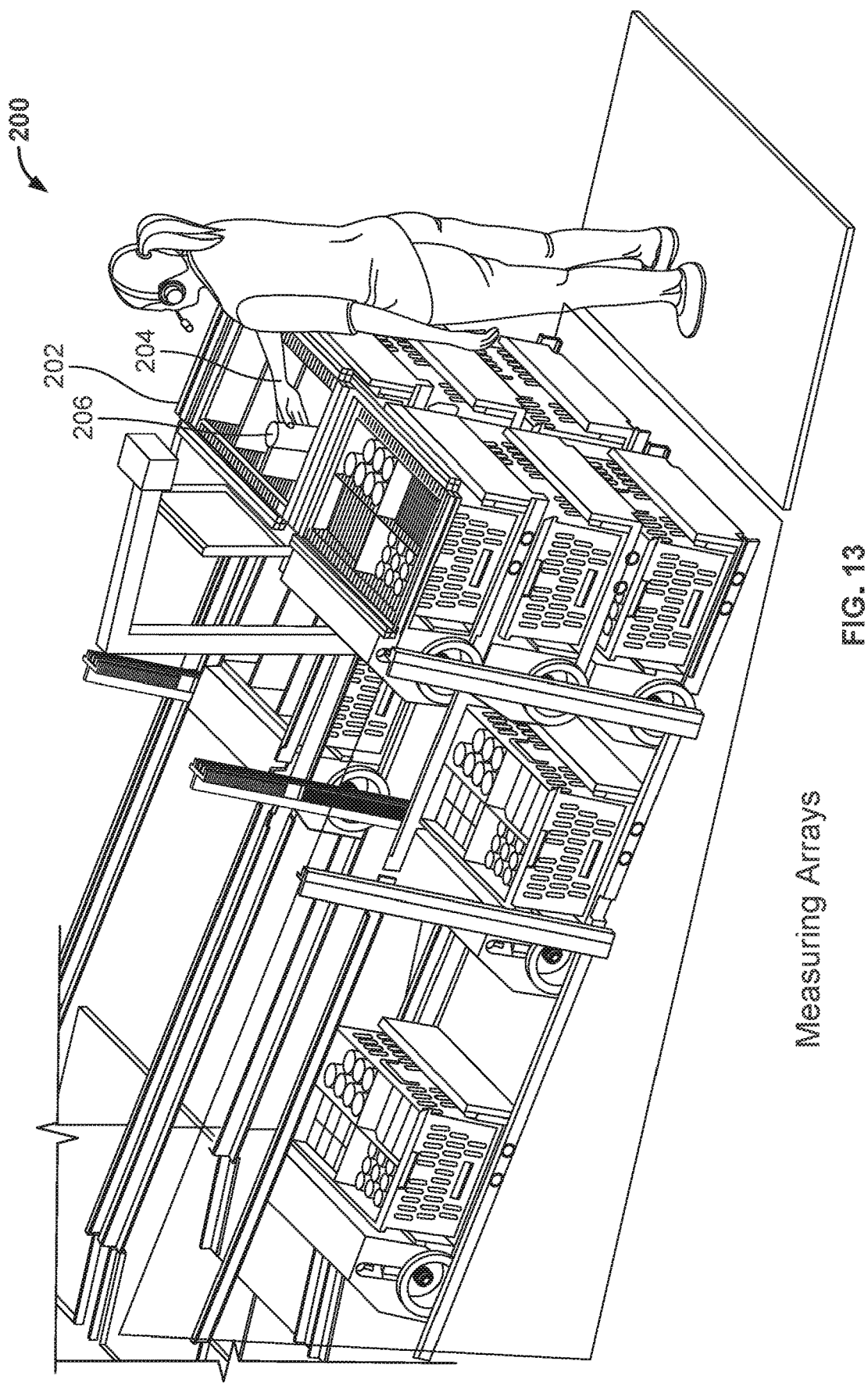
Figure 16:
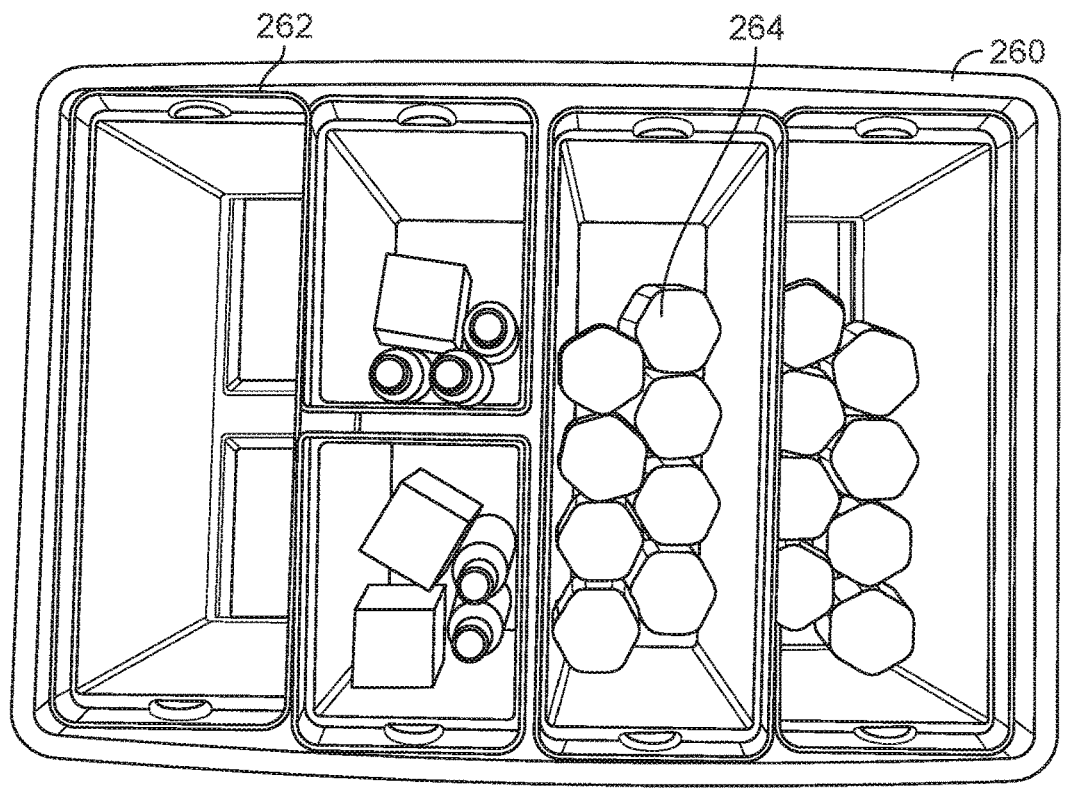
Figure 17:
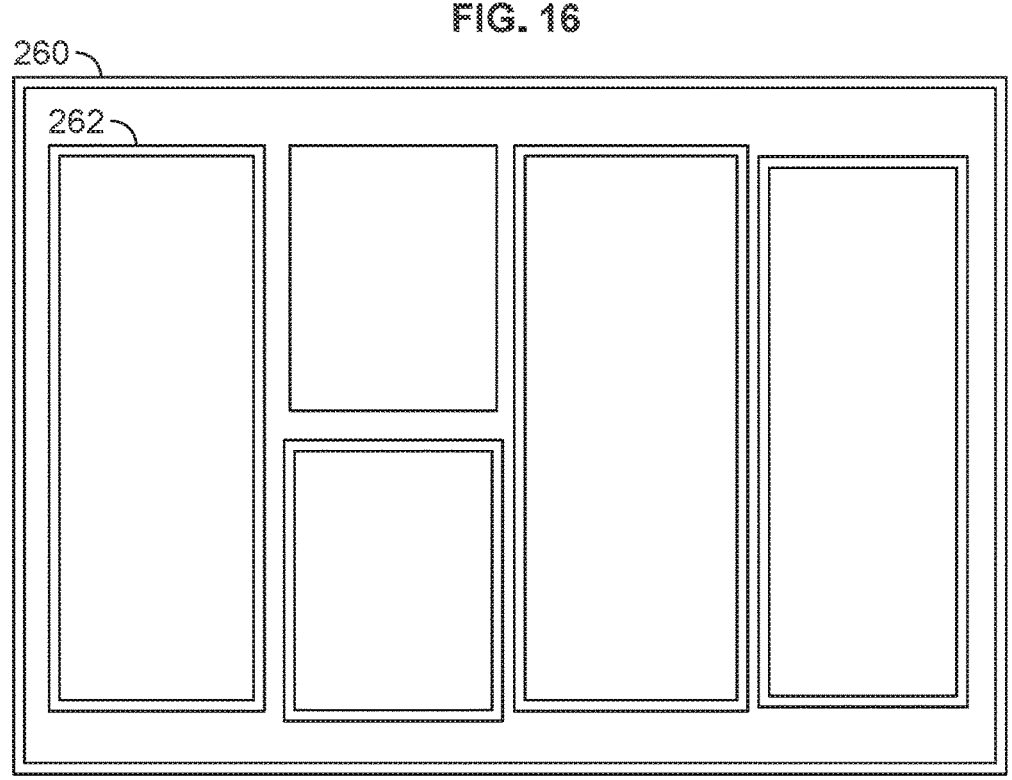
Figure 18:
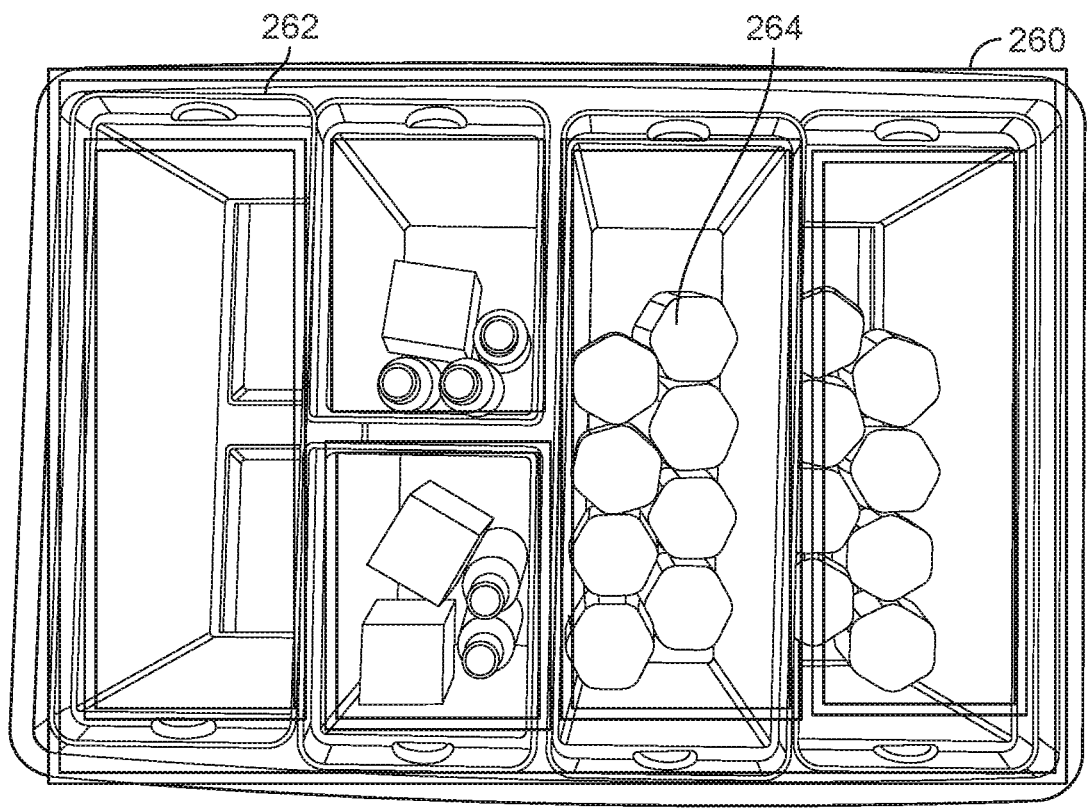
Figure 19:
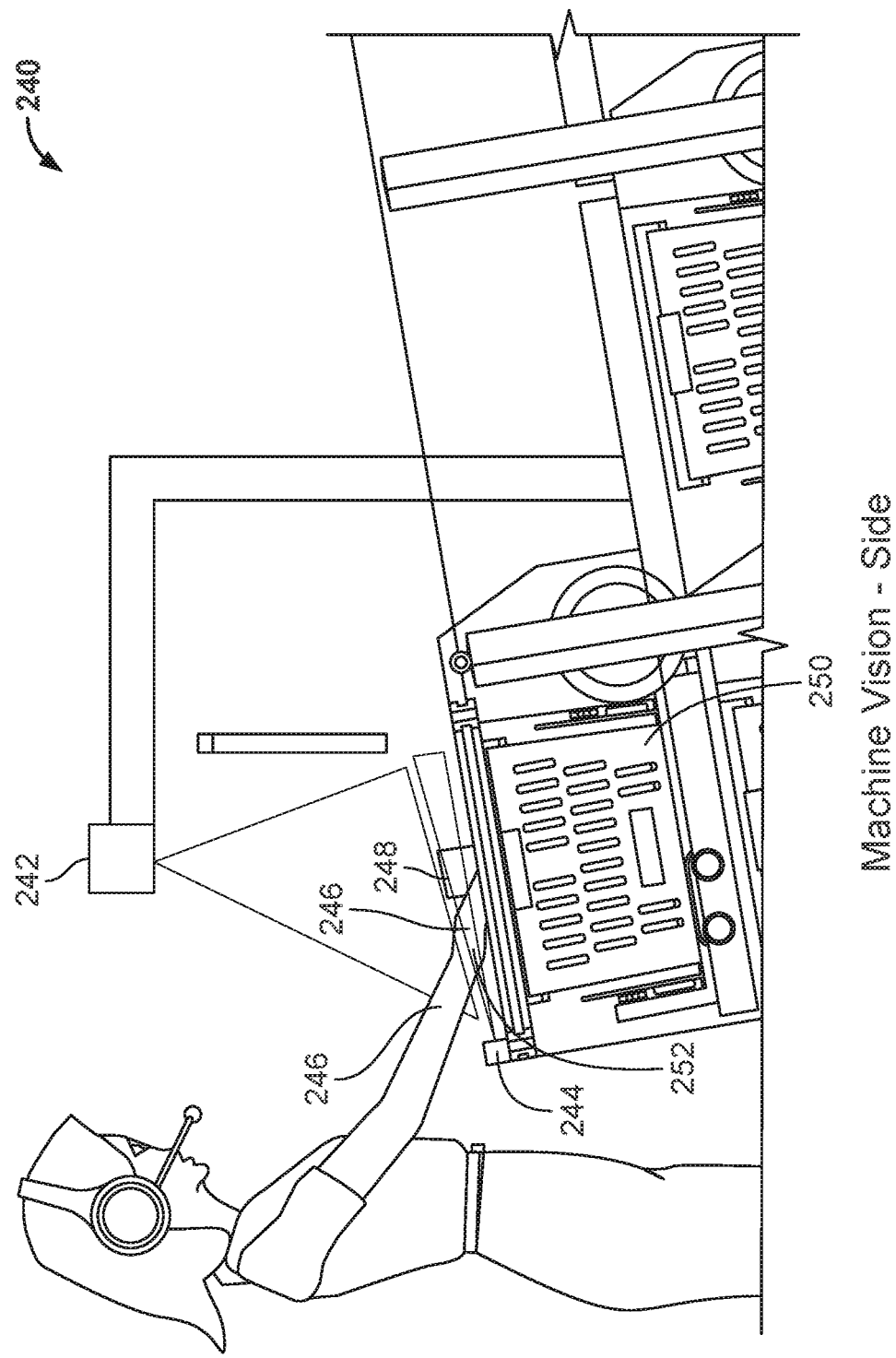
Figure 20:
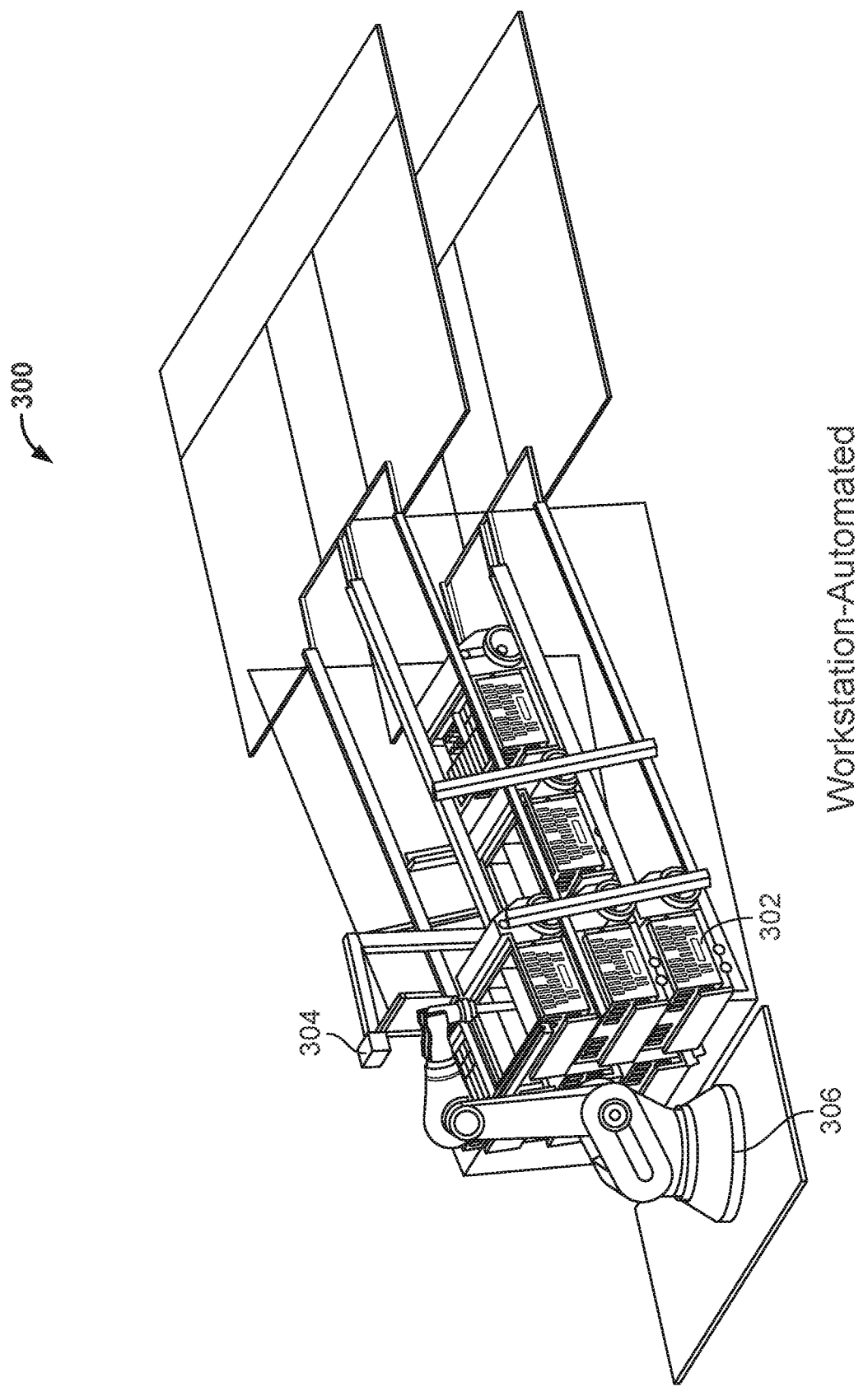
Figure 21:
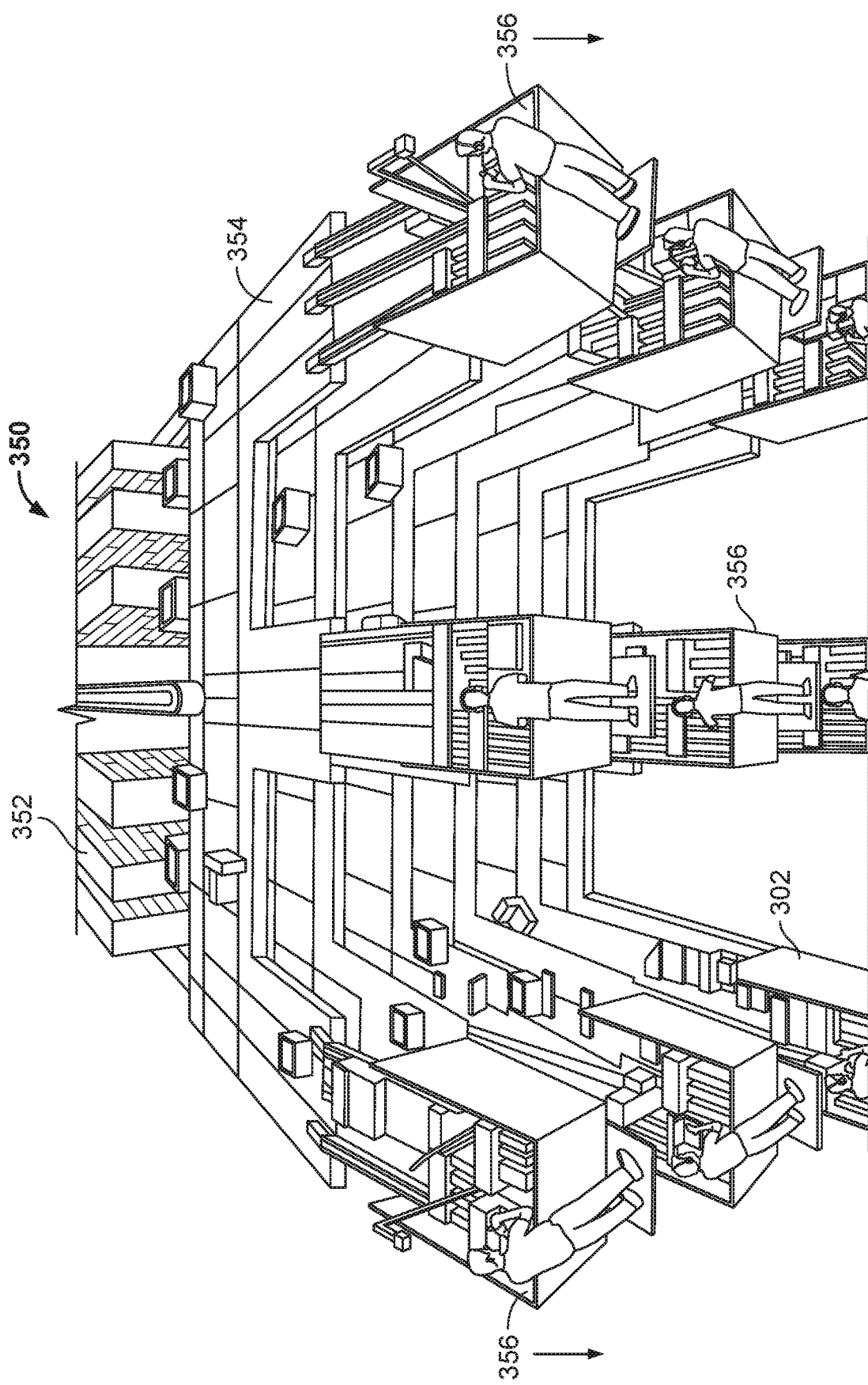
Figure 24:
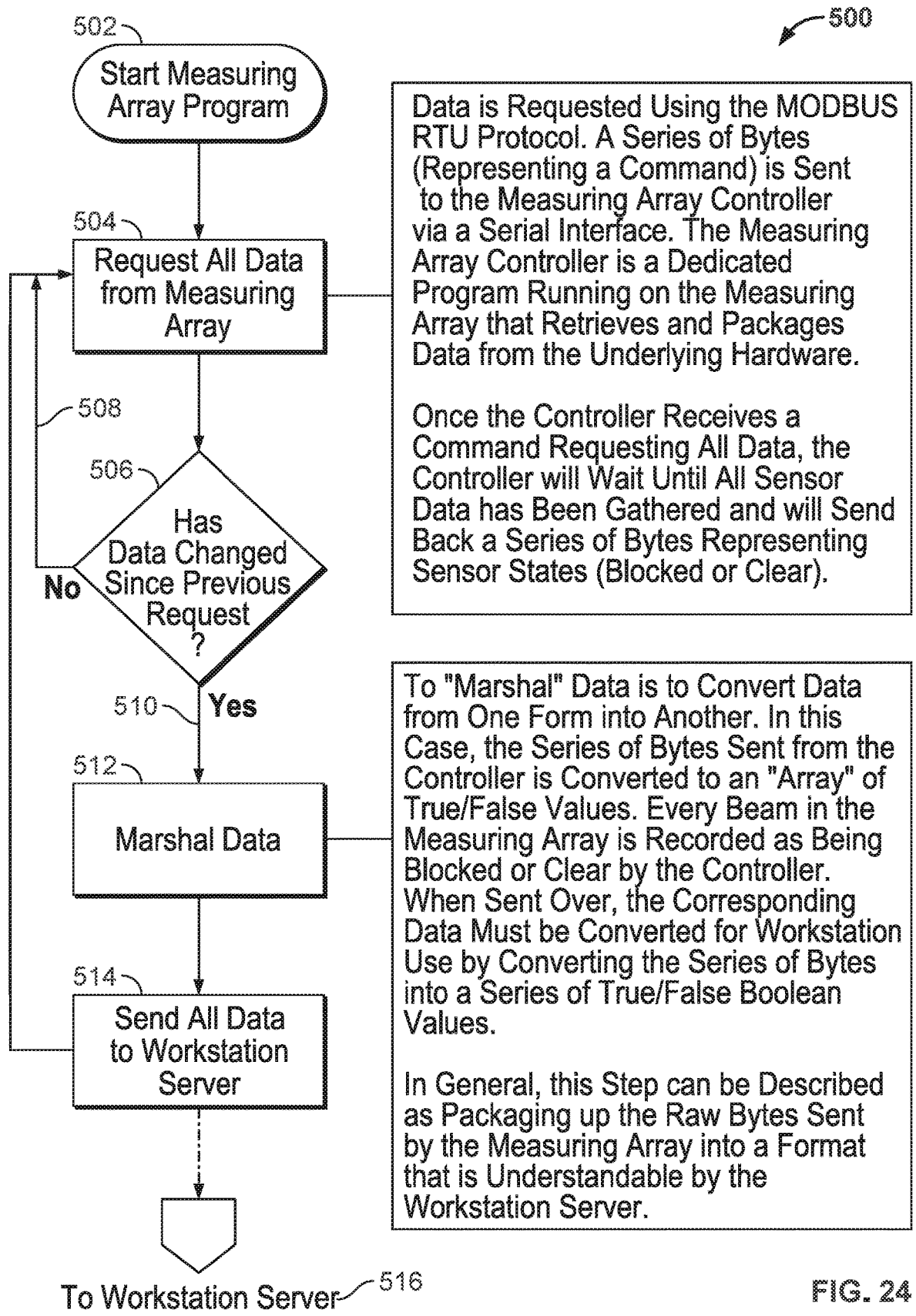
Figure 25:
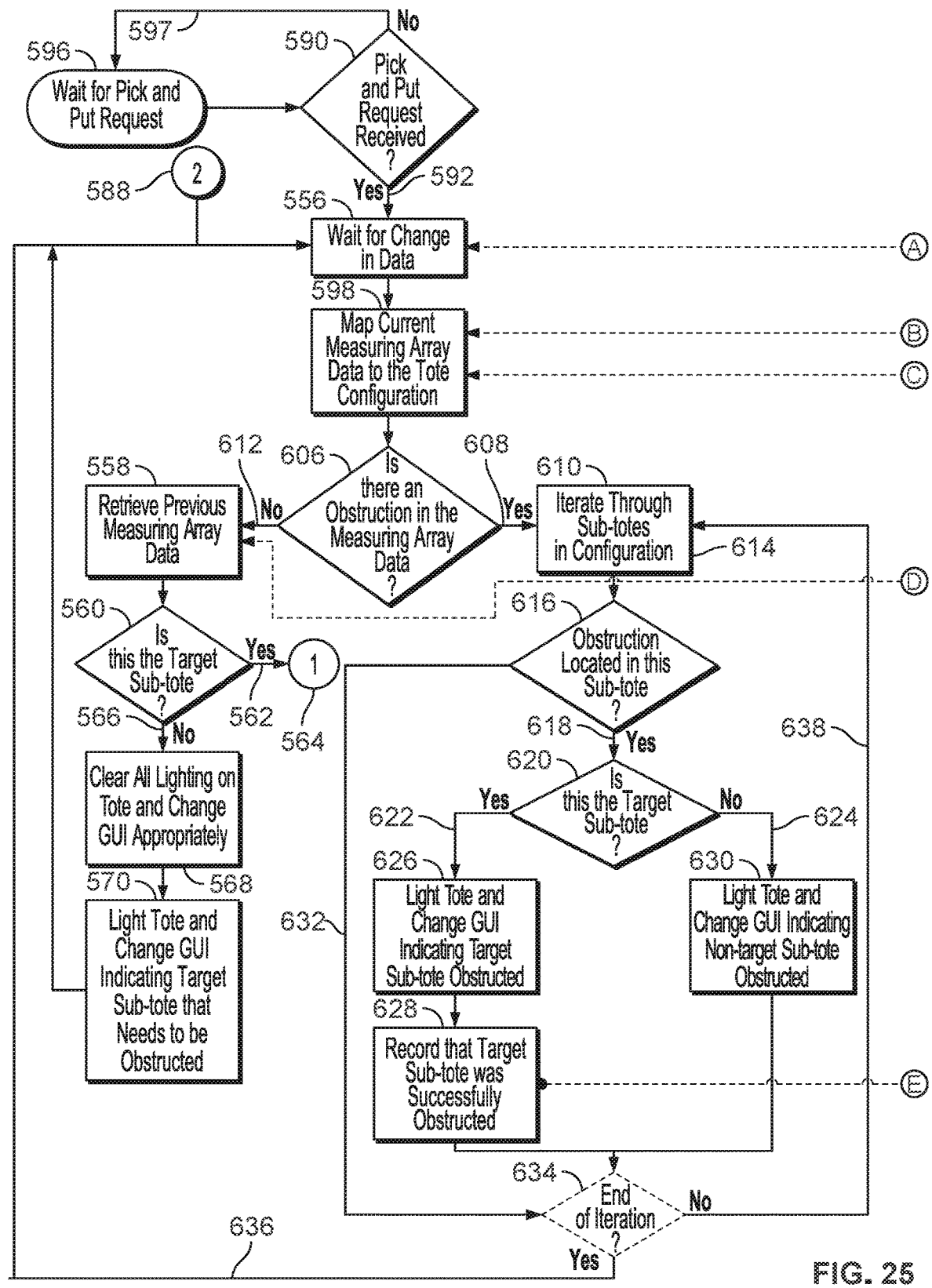
Figure 25:
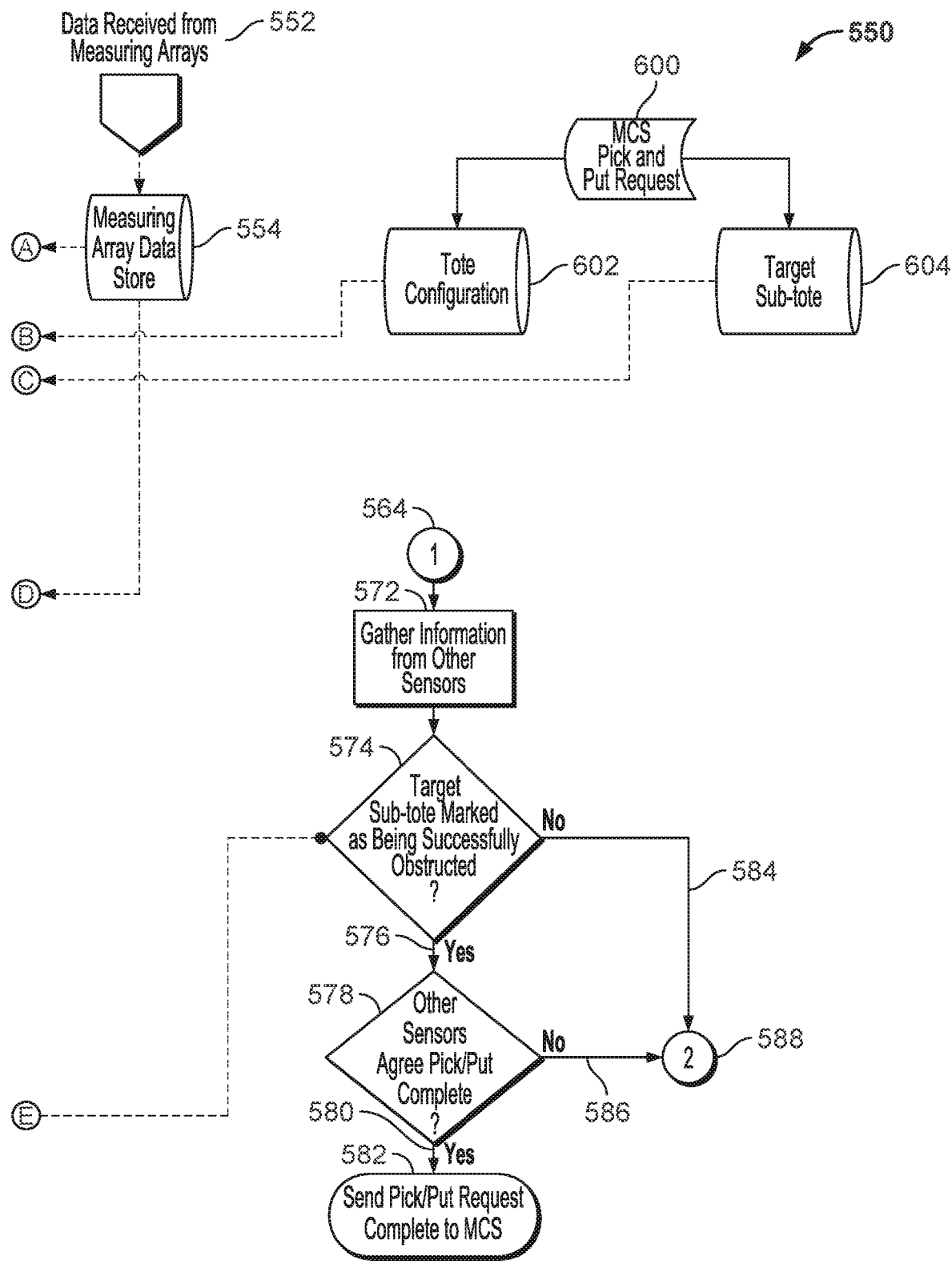

FIG. 1 shows an isometric view of a tower workstation;
FIG. 2 shows a side view of a tower workstation;
FIG. 3 shows a top view of a tower workstation;
FIG. 4 shows a front view of a tower workstation;
FIG. 5 shows an isometric view of a ferris workstation;
FIG. 6 shows a side view of a ferris workstation;
FIG. 7 shows a top view of a ferris workstation;
FIG. 8 shows a front view of a ferris workstation;
FIG. 8A shows an exploded of a ferris workstation;
FIG. 9 shows an isometric view of a ferris workstation;
FIG. 10 shows a side view of a ferris workstation;
FIG. 11 shows a top view of a ferris workstation;
FIG. 12 shows a front view of a ferris workstation;
FIG. 12A shows an exploded of a ferris workstation;
FIG. 13 shows a workstation with measuring arrays;
FIGS. 14A and 14B show measuring arrays;
FIG. 15 (Machine Vision and Measuring Arrays) shows an over-the-shoulder view of the picker workstation and related components (Cameras, Measuring Arrays, Projector, and Touchscreen PC);
FIG. 16 (Tote Image—Overhead Camera) shows an image of a tote at a workstation taken from an overhead Camera;
FIG. 17 (Recognized Sub-Tote Configuration—Machine Vision) shows the graphical representation of the recognized sub-tote configuration created by the machine vision system using pattern recognition;
FIG. 18 (Sub-Tote Configuration Overlay—Machine Vision) shows the overlay of FIGS. 16 and 17 that is used to determine occlusions of the recognized pattern of sub-totes;
FIG. 19 (Machine Vision—Side) shows a side view of the picker workstation including overhead and side-mounted cameras and their respective angles of observation;
FIG. 20 shows an automated workstation;
FIG. 21 shows arrayed workstations;
FIG. 22 shows a Tote and Measuring Array Configuration;
FIG. 23 shows an example tote layout;
FIG. 24 shows a process flow diagram; and
FIG. 25 shows a process flow diagram.

DETAILED DESCRIPTION

Although the present technology will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

Automated each-picking systems require the use of human or robotic operators (aka Pickers) at designated workstations to transfer "eaches" from product totes to customer order totes. Significant improvements in pick-rates (defined as the time required to fully transfer an each from one tote to another) are realized if machines supplement the picker and automatically verify the actions of an operator, for example, a human operator, allowing the picker to focus solely on the transferring of product as disclosed herein.

The disclosed embodiment may utilize apparatus and methods as disclosed in U.S. Pat. No. 9,139,363 and entitled "Automated System for Transporting Payloads", U.S. Pat. No. 9,598,239 and entitled "Automated System for Transporting Payloads", U.S. Patent Publication Number 2016-0355337 and entitled "Storage and Retrieval System", U.S. Patent Publication Number 2017-0313514 and entitled "Order Fulfillment System", U.S. patent application Ser. No. 15/816,832 filed Nov. 17, 2017 and entitled "Order Fulfillment System", U.S. patent application Ser. No. 15/867,373 filed Jan. 10, 2018 and entitled "System and Method of Robot Task Assignment and management", U.S. patent application Ser. No. 15/826,045 filed Nov. 29, 2017 and entitled "Inventory Management System", U.S. patent application Ser. No. 15/884,677 filed Jan. 31, 2018 and entitled "Automated Proxy Picker System for Non-Fungible Goods"; and U.S. patent application Ser. No. 15/884,938 filed Jan. 31, 2018 and entitled "Packing by Destination for Automated Fulfilled Goods" all of which are incorporated by reference herein in their entirety.

Referring now to FIG. 1, there is shown an isometric view of a tower workstation 10. Referring also to FIG. 2, there is shown a side view of a tower workstation 10. Referring also to FIG. 3, there is shown a top view of a tower workstation 10. Referring also to FIG. 4, there is shown a front view of a tower workstation 10. Tower workstation 10 has ramps that support bots 12, 14 where bots 12, 14 themselves climb through the workstation, and where the only moving parts may be the bots 12, 14 and the pickers 16 hands 18. Here, product and order totes 20, 22 are provided where the operator 16 is directed by a light directed pick and put system 24 and where the light directed pick and put system highlights products to be moved from product totes to order totes and where a GUI 26 may further be provided. In the disclosed embodiment, bots containing product and order totes are circulated through the workstation from one level to another where the operator fulfills orders of combinations of eaches in order totes by drawing from one or more of the product totes as directed by the light directed pick/put system.

Referring now to FIG. 5, there is shown an isometric view of a ferris workstation 50. Referring also to FIG. 6, there is shown a side view of a ferris workstation 50. Referring also to FIG. 7, there is shown a top view of a ferris workstation 50. Referring also to FIG. 8, there is shown a front view of a ferris workstation 50. Referring to FIG. 8A, there is shown an exploded perspective view of a ferris workstation 50. Ferris workstation 50 has ramps 76 that support bots 52, 54 where bots 52, 54 themselves are circulated through the workstation, and where the bots 52, 54 may not be required to climb. Here, the picker 56 picks material from product totes with their hands 58 and places the product in order totes. Here, product and order totes 60, 62 are provided where the operator 56 is directed by a light directed pick and put system 64 and where the light directed pick and put system highlights products to be moved from product totes to order totes. In the disclosed embodiment, bots containing product and order totes are circulated through the workstation from one level to another where the operator fulfills orders of combinations of eaches in order totes by drawing from one or more of the product totes as directed by the light directed pick/put system.

The bots are circulated through a "ferris wheel" style arrangement where two independent ferris wheel style lifts circulate product and order bots independently from one ramp level to another. Here, each ferris wheel comprises a wheel 70 formed by a number of radially extending spokes 71. The spokes 71 of each wheel 70 are rotated by independent drive motors 72 mounted at the center of rotation of wheel 70. It is understood that wheel 70 may be driven by other types of drive systems in further embodiments. Each of the spokes 71 has a first end fixed at an axis of rotation of the wheel 70, and a second end rotationally affixed to a link constraint 74.

Each driven wheel 70 has supports 76 which may be trays that support bots and are constrained to remain in a horizontal orientation by link constraints 74. Each link constraint 74 includes a first end rotationally mounted to a spoke 71, and a second end fixedly mounted to a shaft (not shown) which is in turn fixedly mounted to a bottom portion of a support 76. Thus, the constraints 74 maintain a fixed angle with respect to the supports 76. The shaft is mounted through a hole in the second end of spoke 71 to enable the support 76, link constraint 74 and shaft to rotate with respect to a spoke 71.

Each constraint 74 includes a second end including a cam follower 78 which rides within channels of guide rails 80. The guide rails 80 are mounted at the station 50 in fixed positions by plates or other mounts (not shown). Constrained to ride within the channels of the guide rails 80, each link constraint 74 (and in turn bot supports 76) rotates counterclockwise about the end of a spoke 71 (for example from the perspective of FIG. 6) while the spoke 71 is driven to rotate clockwise about the center of wheel 70. Thus, the cam followers 78 on the end of each bot tray link constraint 74 keep the Bot trays 76 flat during rotation of the wheel 70. The guide rails 80 may be made slightly non-circular to cause the Bot tray supports 74 to tilt approximately 15 degrees in pitch to make the tote more ergonomically accessible to the picker. The guide rails 80 may be made more or less oblong to tilt the tote toward a picker more or less than 15 degrees in further embodiments.

Selectively driving wheel 70 circulates supports 76 to selectively present and bring tote containing bots to operator 56. With the ferris style as disclosed, the workstation rotates bots to the picker where one bot enters (rolls onto a support 76) and one bot leaves (rolls off of a support 76) during a pick. Here, there is potentially faster throughput as the bots are not required to engage the tower. Here, a linkage style ferris wheel mechanism is disclosed to hold the bots level.

The mechanical components shown in FIGS. 5-8A may be varied while still accomplishing the ferris wheel-type rotation of support trays 76 in a generally horizontal orientation. One further embodiment is shown in FIGS. 9-12A. Referring now to FIG. 9, there is shown an isometric view of a ferris workstation 100. Referring also to FIG. 10, there is shown a side view of a ferris workstation 100. Referring also to FIG. 11, there is shown a top view of a ferris workstation 100. Referring also to FIG. 12, there is shown a front view of a ferris workstation 100. Referring also to FIG. 12A, there is shown an exploded perspective view of a ferris workstation 100. Ferris workstation 100 has support trays 130 that support bots 102, 104 where bots 102, 104 themselves are circulated through the workstation, and where the bots 102, 104 may not be required to climb. Here, the picker 106 picks material from product totes with their hands 108 and places the product in order totes. Here, product and order totes 110, 112 are provided where the operator 106 is directed by a light directed pick and put system 114 and where the light directed pick and put system highlights products to be moved from product totes to order totes. In the disclosed embodiments, bots containing product and order totes are circulated through the workstation from one level to another where the operator fulfills orders of combinations of eaches in order totes by drawing from one or more of the product totes as directed by the light directed pick/put system. The bots are circulated through a "ferris wheel" style arrangement where two independent ferris wheel style lifts circulate product and order bots independently form one ramp level to another. Here, motor 120 driven wheel (or gear) 122 has supports 130 that support bots and are constrained by chain 124 with one grounded sprocket 126 and another, outer sprocket 128 coupled to support 130. Instead of motor 120 and solid wheel 122, drive motor 72 and spokes 71 described above may be used, where each spoke 71 has a first end rotationally mounted at its axis of rotation and a second end including an outer sprocket 128. Likewise, the motor 72 and spokes 71 in the embodiment of FIGS. 5-8A may be replaced with a solid wheel 122 driven by a motor 120 as shown in FIGS. 9-12A.

The wheel 122 is mounted on a fixed shaft (not shown) so as to rotate with respect to the shaft by the motor 120. The fixed shaft may further include three separate grounded sprockets 126 that are stationarily mounted at distinct locations along the length of the fixed shaft. Each grounded sprocket 126 is connected to respective outer sprockets 128 by a chain 124. Each outer sprocket 128 is in turn fixedly mounted to a shaft 132 (FIG. 12A), which shaft is fixedly mounted to a bottom of support 130. As wheel 122 rotates clockwise with the outer sprockets 128, the grounded sprockets 126 and chains 124 cause the outer sprockets 128 to rotate counterclockwise. Thus, the grounded sprockets 126, outer sprockets 128 and chains 124 keep the bot trays 1230 flat during rotation of the wheel 122.

Selectively driving wheel or gear 122 circulates supports 130 to selectively present and bring tote containing bots to operator 106. With the ferris style as disclosed, the workstation rotates bots to the picker where one bot enters and one bot leaves during a pick. Here, there is potentially faster throughput as the bots are not required to engage the tower. Here, a chain style ferris wheel mechanism is disclosed to hold the bots level.

Referring now to FIG. 13, there is shown a workstation 200 with measuring arrays 202. Referring also to FIGS. 14A and 14B, there is shown a workstation 200' with measuring arrays 202'. In each case measuring arrays 202, 202' may be used to detect position of hands 204, 204' and eaches 206, 206' during transfer, confirms correct pick and place positions and controls the bot (or Ferris rotation) without any need for the picker to push a button. Here, the picker can focus on transferring eaches, directed by light. Measuring arrays also confirm nothing sticking up higher than tote edges. Exception handling may be provided where a directed projected message and/or on the perimeter, or above the totes may further be provided to give the picker an indication if a wrong pick or place has occurred. Similarly, machine vision may be provided above, or a low camera angle may be provided to see into the picker's hand. With ferris style workstations, machine vision may preferred over measuring arrays since the totes can rotate up and through. The overhead cameras may also be provided to detect the sub-tote configuration within each tote. The measuring arrays may be digital input in the sense that they are simply detecting if the plane directly above the pick and place tote is penetrated (by picker's hand and presumably item in it). While this may not be considered a "machine vision system," machine vision cameras may be provided at two or more locations as will be described. In one aspect, a machine vision system may be deployed first, above looking down to try to confirm the picker does indeed have a, preferably the, right item in their hand. The overhead cameras can also look down into the pick tote and order bag to confirm an item has been removed from the tote, an item, preferably the right item, has been placed into the order bag. The overhead machine vision camera may alternatively be used to eliminate the measuring arrays once matured enough to recognize item transfer from correct product tote to order bag. In another aspect, a machine vision system may be deployed second, as low angle machine vision camera(s) that are able to see under the picker's hand to first identify they have an item they are transferring, and preferably able to recognize it's the right item by label, color, shape or UPC.

The disclosed embodiment provides an alternative solution for verifying the transfer of an each using a machine vision system that validates the actions of the picker. To verify that each transfer is accurate and complete, the vision system determines: 1) If a human hand is breaching the surface of a tote, 2) in which tote (or sub-tote) the human hand is located, 3) if the human hand is physically transferring an each from one tote to another, and 4) if the human is transferring the correct or expected each. Referring also to FIGS. 15 and 19, vision system 240 uses multiple cameras 242, 244 mounted at different angles around the workstation; each angle providing an ideal perspective for validating one of the occurrences described above, detecting hand 246, each 248 and tote/subtote 250. At least one camera 242 is mounted approximately 4 feet above the workstation (looking downward) and uses pattern recognition to 1) define the perimeter of each tote and/or sub-totes and 2) detect the presence or absence of a human hand within that perimeter. At least two side-facing cameras 244 are also mounted around the perimeter of the workstation and use a combination of thermal imaging and optical pattern recognition to 1) define the surface plane of the tote and 2) the presence or absence of a human hand breaching the surface plane. These side-facing cameras also use object recognition (and/or background subtraction) to determine 1) if the human hand is holding an object when entering and exiting the tote and 2) if there is an object protruding out of the surface of the tote. While not essential, pickers may wear patterned gloves 252 and patterned background panels may be created positioned opposite of the side-facing cameras. These patterns can facilitate the vision detection by easily tracking hand position and subtracting them from the image to isolate an object (each).

Referring also to FIGS. 16-18, during the typical pick cycle, the machine vision system detects the actions of the picker (in real-time) and the relevant attributes of the totes 260. At the start of the picking process, product and order totes approach the picker while the overhead camera(s) search for patterns of contours within the tote 260. If the same pattern is detected after a defined number of consecutive frames, the pattern is deemed consistent and the perimeter of the tote 260 and sub-totes 262 are defined with eaches 264 therein. For greater levels of confidence, the automated each-picking system can provide the expected configuration of sub-totes to the vision system for comparison analysis. As seen in FIG. 19, while the overhead camera(s) 242 is determining the perimeter of the totes 250, the side facing cameras 244 are concurrently determining the surface plane of the totes using the same pattern recognition logic. Once the tote attributes are defined, the automated each-picking system will provide the pick location within the product tote via a pick/put-to-light system or through a workstation GUI. As the picker begins to reach into the tote, the overhead cameras will detect the presence of the picker's hand and track its movement within the perimeter of the product tote. Once the side-facing cameras determine that the picker's hand has breached the surface of the tote, the overhead cameras will validate if the picker's hand is occluding the correct sub-tote perimeter within the product tote. If the picker's hand is breaching the surface of the tote but is occluding the incorrect sub-tote perimeter within the product tote, the workstation will give an error message/indicator to the picker. Once the side-facing cameras determine that the picker's hand has exited the product-tote, they will conduct an image analysis of the picker's hand to detect the presence of an each. Using thermal imaging and background subtraction, the side-facing cameras will detect an object that the picker may be holding. If an object is not detected within the image captured by the side-facing cameras, the picker may be asked to present the object clearly to the cameras for validation. The picker then proceeds to reach into the order tote to place the each, at which point the side-facing cameras determine a second breach within the tote surface. The overhead camera(s) then determine if the picker's hand is occluding the correct sub-tote perimeter within the order tote. Once the side-facing cameras have determined the picker's hand has exited the order tote, they will conduct another image analysis to detect the absence of an each. If the vision system detects the possibility of an each in the picker's hand, the picker may be instructed to clearly present their empty palm to the cameras.

Referring now to FIG. 20, there is shown an automated workstation 300. Automated workstation 300 is shown having climbing bots 302, vision system 304 and robot 306. Here, robot 306 may take the place of the picker or operator as previously described where features disclosed may be used alone or in combination with robot 306. A robot 306 may be used in place of a human picker in any of the above-described embodiments.

Referring now to FIG. 21, there is shown arrayed workstations 350. Here workstations cooperate with an inventory storage and order fulfillment system 350 where inventory storage arrays 352 of totes are provided accessible by bots via multiple transit decks 354 to multiple workstations 356.

Referring now to FIG. 22, there is shown a Tote and Measuring Array Configuration 380. Referring also to FIG. 23, there is shown an example tote layout 400. The array configuration may have features as disclosed where array 380 may have measuring array pair #1 emitter and receiver 384, 386, measuring array pair #2 emitter and receiver 388, 390 adapted to measure features interacting with tote 382. Tote 400 is shown with exemplary sub totes 402, 404, 406, 408. Disclosed acronyms may include:

MCS—Material Control System—the master server software that coordinates all actions within its purview. Every workstation is connected to the same MCS instance.

WS—Workstation Server—the local server running on the workstation. There is one workstation server per workstation.

GUI—Graphical User Interface—A user-facing interface that displays information using text or graphics. A workstation will have one main GUI and the picker will be the primary consumer of the GUI information.

Tote—The "parent" container tote that houses "child" sub-totes.

Sub-tote—A smaller tote that, combined with other sub-totes, fills out a parent tote. A sub-tote can take on multiple sizes up to the size of the parent tote.

To correctly assess whether a picker's hand has entered the correct sub-tote, the workstation employs measuring arrays to precisely identify obstructions in a 2-D plane. A measuring array is a series of paired emitters and receivers placed close to each other that are all connected to a controller. This controller identifies when any number of light beams have been obstructed and can determine the obstructed beams location. Two measuring arrays pairs are placed around each tote in the workstation, one in the "X axis" and one on the "Y axis" as seen in FIG. 22. The measuring arrays are continuously being polled to find out which beams have been obstructed and which are clear. This information is then sent to the WS which then updates records held in internal memory. At the start of a pick-put cycle, the MCS sends a pick and put request to the WS. This request includes the layout of the tote and the target sub-tote. The layout of the tote is defined as the make-up of the sub-totes within the tote. An example tote layout is shown in FIG. 23. The target sub-tote is defined as the sub-tote that an item must be picked or put into. Upon receiving a pick and put request, the WS begins watching for any changes in the measuring array data that is held in internal memory. The current tote layout is mapped to the X and Y beam count in the measuring arrays. This mapping is then used to place the obstructions located on the X and Y axis to specific sub-totes. For instance, if sub-tote A is defined as being between beams 1 and 10 on the X axis and between 1 and 5 on the Y axis, then a beam obstruction of 3 on the X axis and 4 on the Y axis would register as an obstruction for sub-tote A. Conversely, an obstruction of 12 on the X axis and 8 on the Y axis would not register as an obstruction for sub-tote A. Note that in this case another sub-tote may be within this obstruction range and register a hit. Multiple sub-totes may be obstructed and detected by iterating through all sub-tote ranges in the current tote layout and running a similar procedure. Once a change in the data is detected, the data is analyzed to see if there is an obstruction in a sub-tote or not. An obstruction in a sub-tote will cause the tote to be illuminated in a manner which indicates the current state it is in. Different states exist for when the target sub-tote is obstructed and for when a non-target sub-tote is obstructed. As an example, a non-target sub-tote may be illuminated red if it is incorrectly obstructed while the target sub-tote is illuminated green. Additionally, a GUI may be updated to reflect this new state along with other information. If a change in data is detected and there is no obstruction to be found in the new data, it assumed that an obstruction was cleared. The previous data set will be retrieved and made available to the WS to apply logic to it. This "cached" data will be used to find that last known exit point of a pickers hand. If the picker exited the target sub-tote after entering it, there is a high degree of confidence that a picker put/retrieved an item from the correct sub-tote. Additional verification from other systems (such as vision) may be used to confirm this. If after exiting the correct sub-tote, no other obstructions are present and all sensors indicate that a pick/put was completed, the MCS is notified that the appropriate tote may be moved and the system is ready to accept the next request. Additional detail is provided with respect to the flow diagrams shown in FIGS. 23 and 24 as described below.

Referring now to FIG. 24, there is shown a process flow diagram 500 that initiates the measuring array and sends data to a workstation server. At 502 the measuring array program is started. At 504, request all data from measuring array. Here, Data is requested using the MODBUS RTU protocol. A series of bytes (representing a command) is sent to the measuring array controller via a serial interface. The measuring array controller is a dedicated program running on the measuring array that retrieves and packages data from the underlying hardware. Once the controller receives a command requesting all data, the controller will wait until all sensor data has been gathered and will send back a series of bytes representing sensor states (Blocked or Clear). At 506, has data changed since the previous request? If yes 510, then go to marshal data 512. Here to "Marshal" data is to convert data from one form into another. In this case, the series of bytes sent from the controller is converted to an "array" of true/false values. Every beam in the measuring array is recorded as being blocked or clear by the controller. When sent over, the corresponding data must be converted for workstation use by converting the series of bytes into a series of true/false Boolean values. In general, this step can be described as packaging up the raw bytes sent by the measuring array into a format that is understandable by the Workstation Server. If no 508, then go to 504 request all data from the measuring array. At 514 send all data to the workstation server where data is sent 516 to the workstation server.

Referring also to FIG. 25, there is shown a process flow diagram 550 from where data is received from the measuring arrays and MCS pick and put requests are initiated. At 552 data is received from measuring arrays and stored at 554 measuring array data store. Here, data may be routed, for example to 556 wait for change in data or 558 retrieve previous measuring array data or otherwise. 558 retrieve previous measuring array data is routed to 560 is this the target sub-tote? If yes 562 then go to 564; if no 566 then go to 568 clear all lighting on tote and change GUI appropriately and then 570 light tote and change GUI indicating target sub-tote that needs to be obstructed and then back to 556 wait for change in data. 564 routes to 572 gather information from other sensors and then 574 Target sub-tote marked as being successfully obstructed? If yes 576 go to 578 if no 584 go to 588. At 578 other sensors agree pick/put complete? If yes 580 go to 582 send pick/put request complete to MCS; if no 586 then go to 588. Here, 588 routes to 556 wait for change in data. At 590 pick and put request received? If yes 592 go to 556 wait for change in data; if no 597 go to 596 wait for pick and put request and then back to 590 wait for pick and put request until a request is received and then to 556 wait for change in data and then to 598 map current measuring array data to the tote configuration. At 600 MCS pick and put requests re initiated where 602 tote configuration and 604 target sub-tote are routed to 598 map current measuring array data to the tote configuration. At 606 is there an obstruction in the measuring array data? If yes 608 then go to 610 iterate through sub-totes in configuration; if no 612 then go to 558 retrieve previous measuring array data. At 610, 614 iterate through sub-totes in the configuration which routes to 616 obstruction located in this sub-tote? If yes 618 then go to 620; if no 632 then go to 634. At 620 is this the target sub-tote? If yes 622 then go to 626 light tote and change GUI indicating target sub-tote obstructed. If no 624 then go to 630 light tote and change GUI indicating non-target sub-tote obstructed. At 626 light tote and change GUI and go to 628 record that target sub-tote was successfully obstructed is routed to 634 End of Iteration? Similarly, 630 light tote and change GUI indicating non-target sub-tote obstructed is routed to 634 End of Iteration? At 634 End of Iteration? If yes 636 then go to 556 wait for change in data; if no 638 then go to 610, 614 iterate through sub-totes in configuration.

The terms "robot" and "bot" may be utilized interchangeably herein in accordance with their conventional meanings, specifically a useful machine or device, namely, a programmable, multifunctional device capable of moving material, parts, tools, or specialized devices through various programmed motions for the performance of a variety of tasks, allocations, designations, or the like; and/or the machine or device being capable of carrying out a simple or complex series of actions; and/or the machine or device being capable of performing tasks that may or may not otherwise be work of a person; and/or the machine or device being a programmable mechanical device capable of performing tasks and interacting with its environment, without the aid of human interaction; and the machine or device being capable of operating automatically or being controlled by a computer.

Unless otherwise noted or defined herein, to the extent directional vocabulary is utilized, the disclosure and figures are described with reference to a conventional three-dimensional coordinate axis system of X, Y and Z, where the X direction is generally left-right or east-west, the Y direction is generally in-out, relative to the plane of the page of the document, and the Z direction is generally up-down or north-south on the page. Further as utilized herein, the terms "horizontal" and "vertical" are utilized consistent with their conventional definitions as would be appreciated by those of skill in the art, and as generally illustrated and expanded upon below. For example, in the fields of physics, engineering, and construction, the direction designated as vertical is usually that along which a plumb-bob hangs in response to the force of gravity. The direction of horizontal is considered along a line or plane that is normal or orthogonal to the vertical plane. As such, moving in a horizontal direction (horizontally) is effectively equivalent to traveling across the earth's surface, e.g., moving forward, backward, left, right, etc., along the ground, while moving in a vertical direction (vertically) is effectively equivalent to moving up (away from the ground) or down (toward or into the ground). Merging the X, Y, Z coordinate access with the terms vertical and horizontal, the Z-axis lies in the vertical direction and the X and Y axes lie in the horizontal plane with the vertical Z axis being orthogonal thereto. To the extent any ambiguity is generated by the specific wording of the above explanations, it is anticipated that such ambiguity may be interpreted and clarified consistent with the conventional interpretations of the terms horizontal and vertical.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

We claim:

1. A workstation for transferring objects from a first container to a second container, the workstation comprising:
   a support structure configured to receive mobile robots carrying the first and second containers; and
   an object pick system comprising indicators configured to:
      direct picking of an object from first predefined section of the first container, and
      direct placing of the object into a second predefined section of the second container, and
   the object pick system further comprising sensors in a fixed position on the support structure and physically disassociated from the containers, the sensors comprising a first group of sensors oriented along an X-axis and a second group of sensors oriented along a Y axis orthogonal to the X axis, the sensors configured to detect obstruction of a plane above at least one of the first and second containers, the X-axis sensors configured to detect an X-axis position of the obstruction of the plane, and the Y-axis sensors configured to detect a Y-axis position of the obstruction of the plane.

2. The workstation of claim 1, wherein the sensors of the object pick system are configured to sense entry and exit of an operator's hand into or from at least one of the first and second predefined sections.

3. The workstation of claim 1, wherein the sensors of the object pick system are configured to sense removal of the object from the first predefined section.

4. The workstation of claim 1, wherein the sensors of the object pick system are configured to sense placement of the object into the second predefined section.

5. The workstation of claim 1, wherein the second predefined section comprises one of the entire second container, a sub-tote within the second container or an order bag.

6. The workstation of claim 1, wherein the first predefined section comprises one of the entire first container or a sub-tote within the first container.

7. The workstation of claim 1, wherein the indicators comprise one or more lights configured to illuminate an area of the first predefined section from which the object is to be removed from the first container for transfer to the second container.

8. The workstation of claim 7, wherein the sensors are configured to sense whether the object is removed from the first predefined section in conformity with the area illuminated by the one or more lights.

9. The workstation of claim 8, wherein the object pick system is further configured to provide a visual indicator of whether or not the object is removed from the first predefined section in conformity with the area illuminated by the one or more lights.

10. The workstation of claim 9, wherein the visual indicator comprises a first colored light when the object is removed in conformity with the illuminated area, and a second colored light when the object is not removed in conformity with the illuminated area.

11. The workstation of claim 1, wherein the indicators comprise one or more lights configured to illuminate an area of the second predefined section into which the object is to be placed.

12. The workstation of claim 11, wherein the sensors are configured to sense whether the object is removed from the first predefined section in conformity with the area illuminated by the one or more lights.

13. The workstation of claim 12, wherein the object pick system is further configured to provide a visual indicator of whether or not the object is placed into the second predefined section in conformity with the area illuminated by the one or more lights.

14. The workstation of claim 13, wherein the visual indicator comprises a first colored light when the object is placed in conformity with the illuminated area, and a second colored light when the object is not placed in conformity with the illuminated area.

15. The workstation of claim 1, wherein sensors of the object pick system comprise one or more optical sensors.

16. The workstation of claim 15, wherein the optical sensors comprise a series of light emitters and receivers.

17. The workstation of claim 15, wherein the optical sensors comprise one or more cameras.

18. The workstation of claim 17, wherein the one or more cameras are configured to sense removal of the object from the first predefined section.

19. The workstation of claim 17, wherein the one or more cameras are configured to sense placement of the object into the second predefined section.

20. A workstation for transferring objects from a first container to a second container, the workstation comprising:
a support structure configured to receive mobile robots carrying the first and second containers; and
an object pick system comprising indicators configured to:
direct picking of an object from first predefined section of the first container, and
direct placing of the object into a second predefined section of the second container, and
the object pick system further comprising a two-dimensional array of sensors in a fixed position on the support structure and physically disassociated from the containers, the two dimensional array of sensors configured to detect obstruction of a plane along a first axis above at least one of the first and second containers, and obstruction of the plane along a second axis orthogonal to the first axis above at least one of the first and second containers, obstruction of the plane along the first and second axes defining unique points of obstructions of the plane.

21. The workstation of claim 20, wherein the sensors of the object pick system are configured to sense entry and exit of an operator's hand into or from at least one of the first and second predefined sections.

22. The workstation of claim 20, wherein the sensors of the object pick system are configured to sense removal of the object from the first predefined section.

23. The workstation of claim 20, wherein the sensors of the object pick system are configured to sense placement of the object into the second predefined section.

24. The workstation of claim 20, wherein the second predefined section comprises one of the entire second container, a sub-tote within the second container or an order bag.

25. The workstation of claim 20, wherein the indicators comprise one or more lights configured to illuminate an area of the first predefined section from which the object is to be removed from the first container for transfer to the second container.

26. The workstation of claim 25, wherein the sensors are configured to sense whether the object is removed from the first predefined section in conformity with the area illuminated by the one or more lights.

27. The workstation of claim 26, wherein the object pick system is further configured to provide a visual indicator of whether or not the object is removed from the first predefined section in conformity with the area illuminated by the one or more lights.

28. The workstation of claim 27, wherein the visual indicator comprises a first colored light when the object is removed in conformity with the illuminated area, and a second colored light when the object is not removed in conformity with the illuminated area.

* * * * *

UNITED STATES PATENT AND TRADEMARK OFFICE
CERTIFICATE OF CORRECTION

| | | |
|---|---|---|
| PATENT NO. | : 10,984,375 B2 | Page 1 of 1 |
| APPLICATION NO. | : 15/956346 | |
| DATED | : April 20, 2021 | |
| INVENTOR(S) | : Lert, Jr. et al. | |

It is certified that error appears in the above-identified patent and that said Letters Patent is hereby corrected as shown below:

On the Title Page

Item (72):
Please change:
"Inventors:
John G. Lert, Jr., Wakefield, MA (US); William J. Fosnight, Windham, NH (US); Devin Lert, Wakefield, MA (US); Stephen Akiki, Lowell, MA (US)"
To:
--Inventors:
John G. Lert, Jr., Wakefield, MA (US); William J. Fosnight, Windham, NH (US); Devin Lert, Wakefield, MA (US); Stephen Akiki, Lowell, MA (US); Bryce Germain, Waltham, MA (US)--

Signed and Sealed this
Twenty-third Day of May, 2023

Katherine Kelly Vidal
*Director of the United States Patent and Trademark Office*